A. M. PRICE.
WRAPPING MACHINE.
APPLICATION FILED SEPT. 13, 1905.

931,646.

Patented Aug. 17, 1909.
16 SHEETS—SHEET 1.

A. M. PRICE.
WRAPPING MACHINE.
APPLICATION FILED SEPT. 13, 1905.

931,646.

Patented Aug. 17, 1909.
16 SHEETS—SHEET 3.

Witnesses:

Inventor:
Albert M. Price
By: Jones & Addington
Attorneys

A. M. PRICE.
WRAPPING MACHINE.
APPLICATION FILED SEPT. 13, 1905.

931,646.

Patented Aug. 17, 1909.
16 SHEETS—SHEET 4.

Witnesses:
Robert N. Weir
W. Perry Hahn

Inventor
Albert M. Price
By: Jones & Addington
Attorneys.

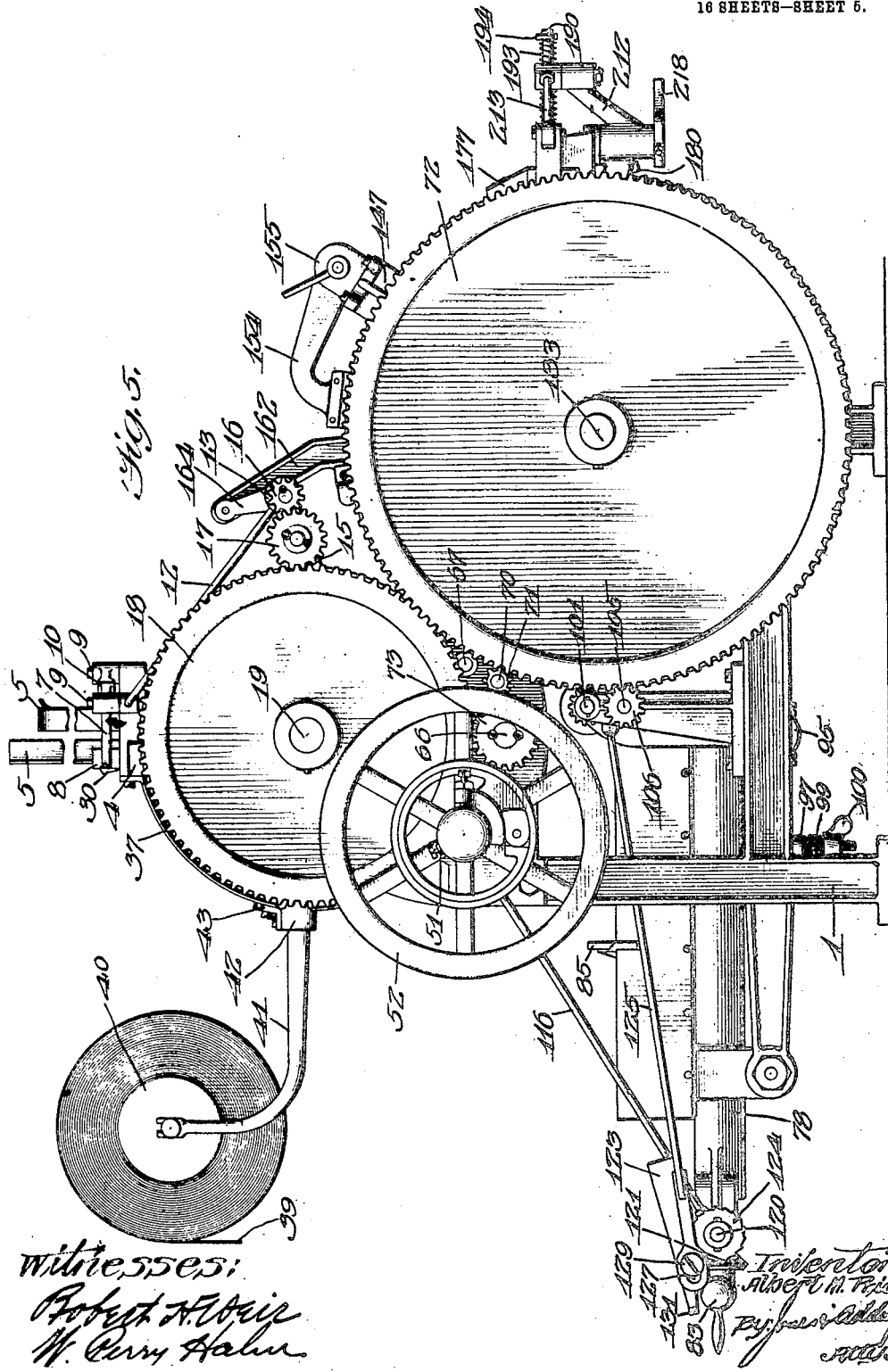

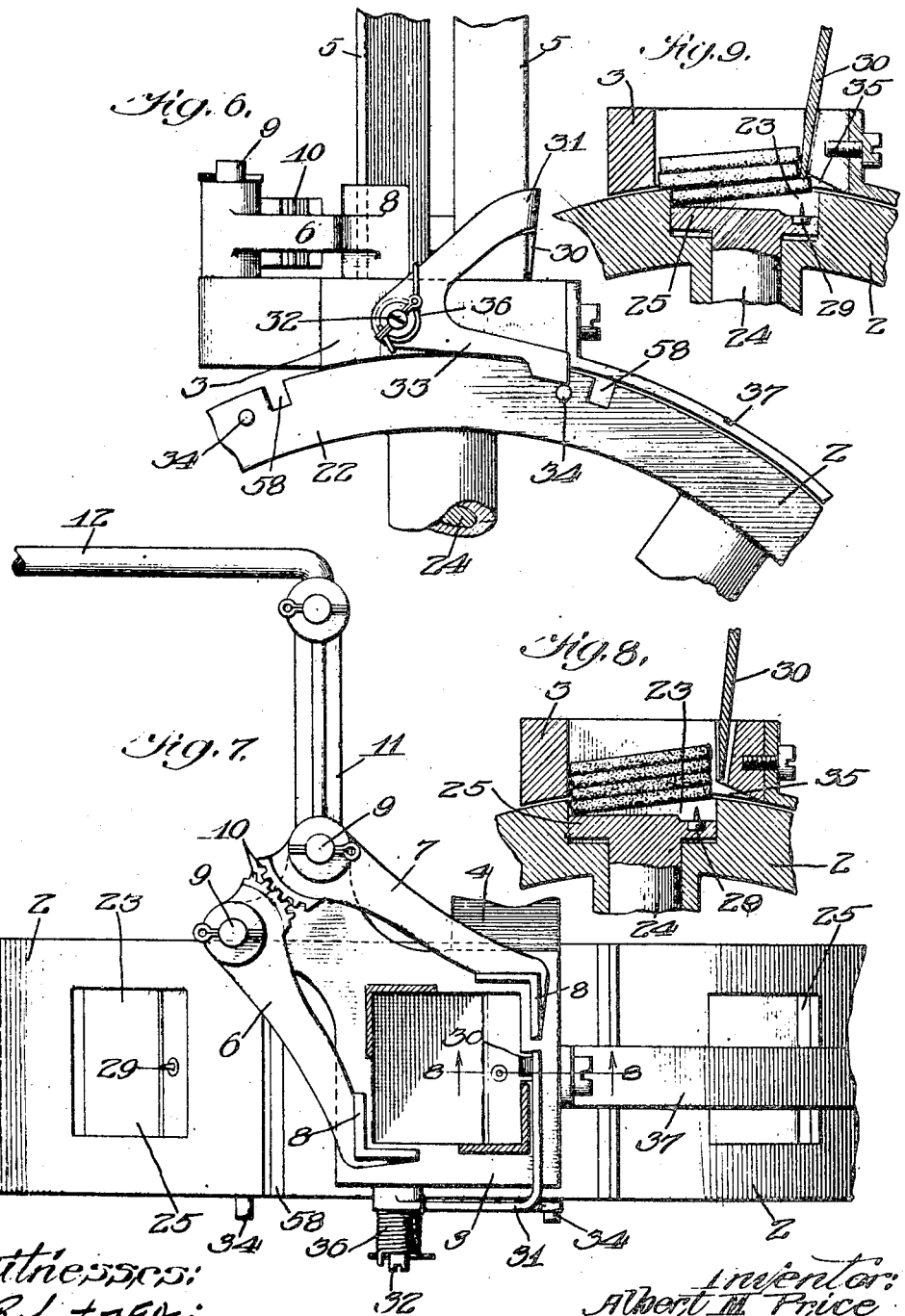

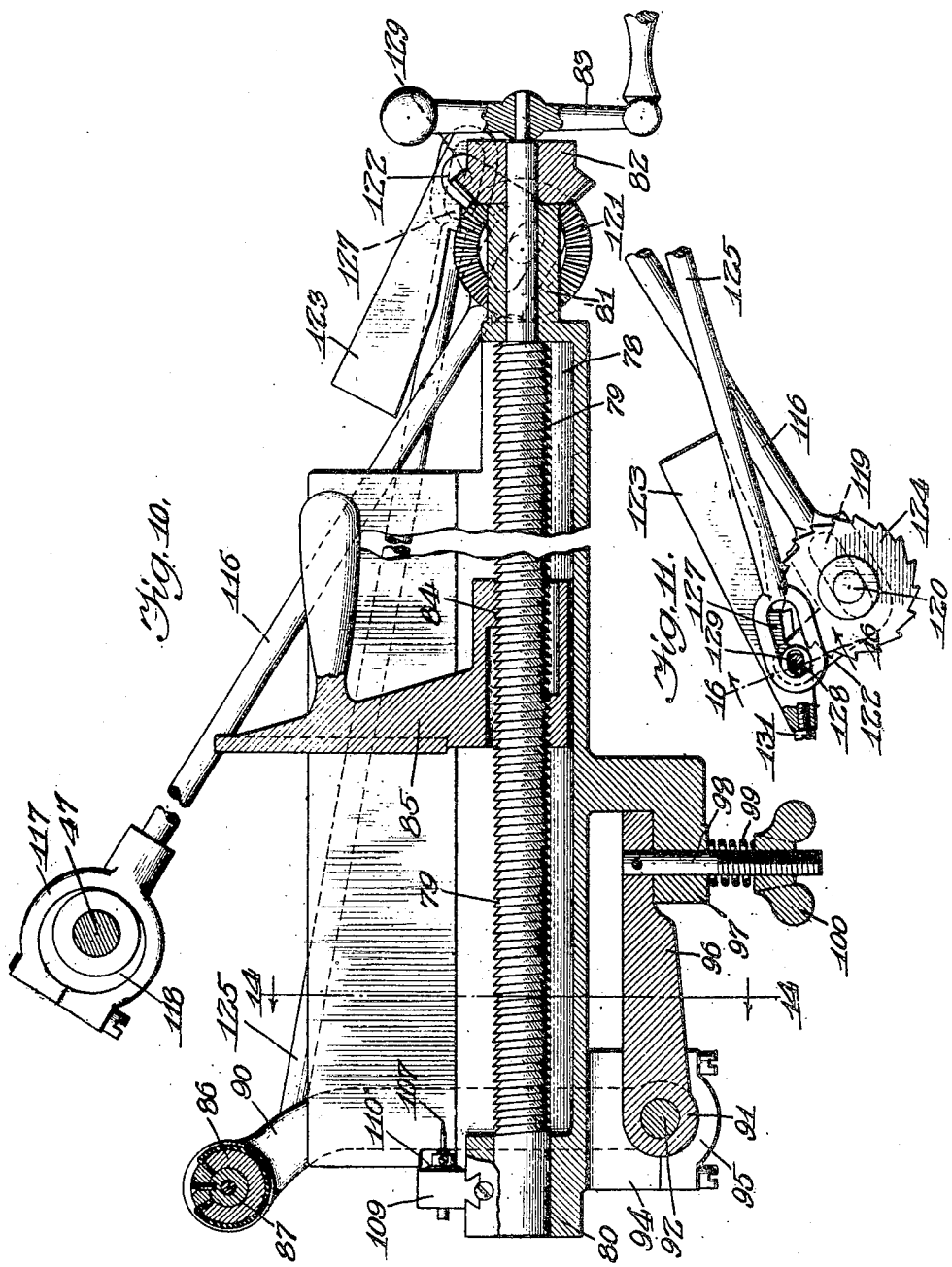

A. M. PRICE.
WRAPPING MACHINE.
APPLICATION FILED SEPT. 13, 1905.
931,646.
Patented Aug. 17, 1909.
16 SHEETS—SHEET 8.
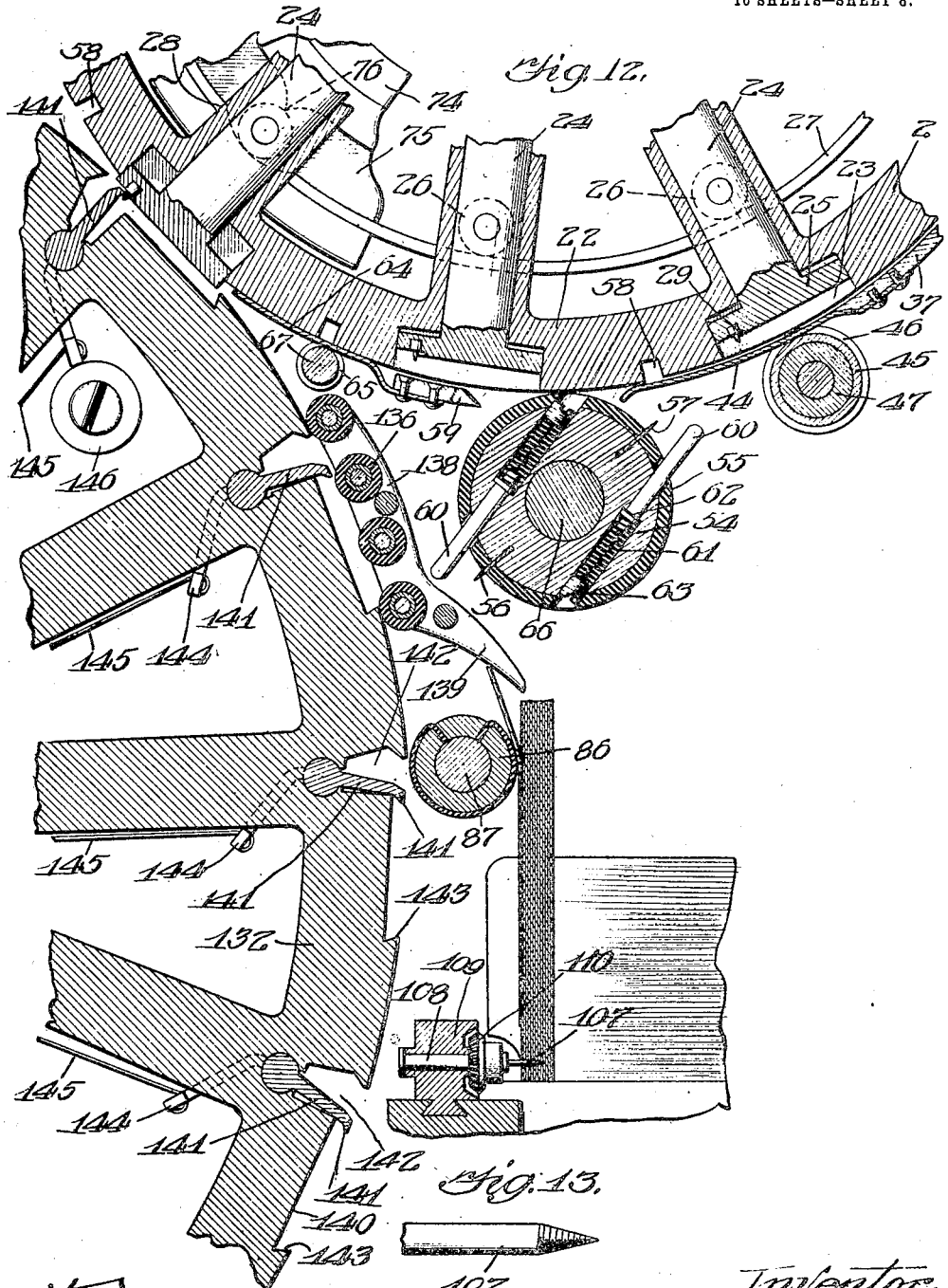

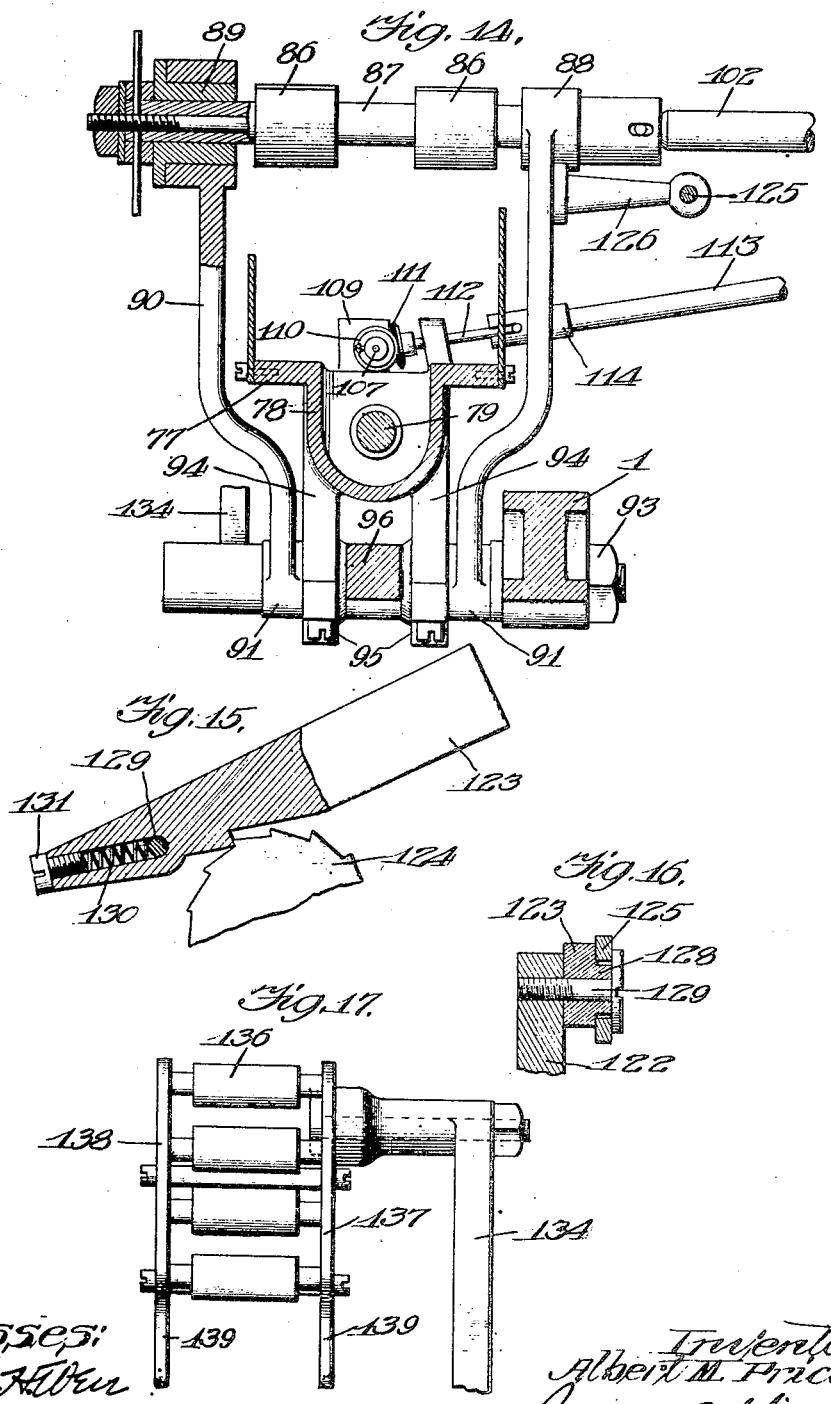

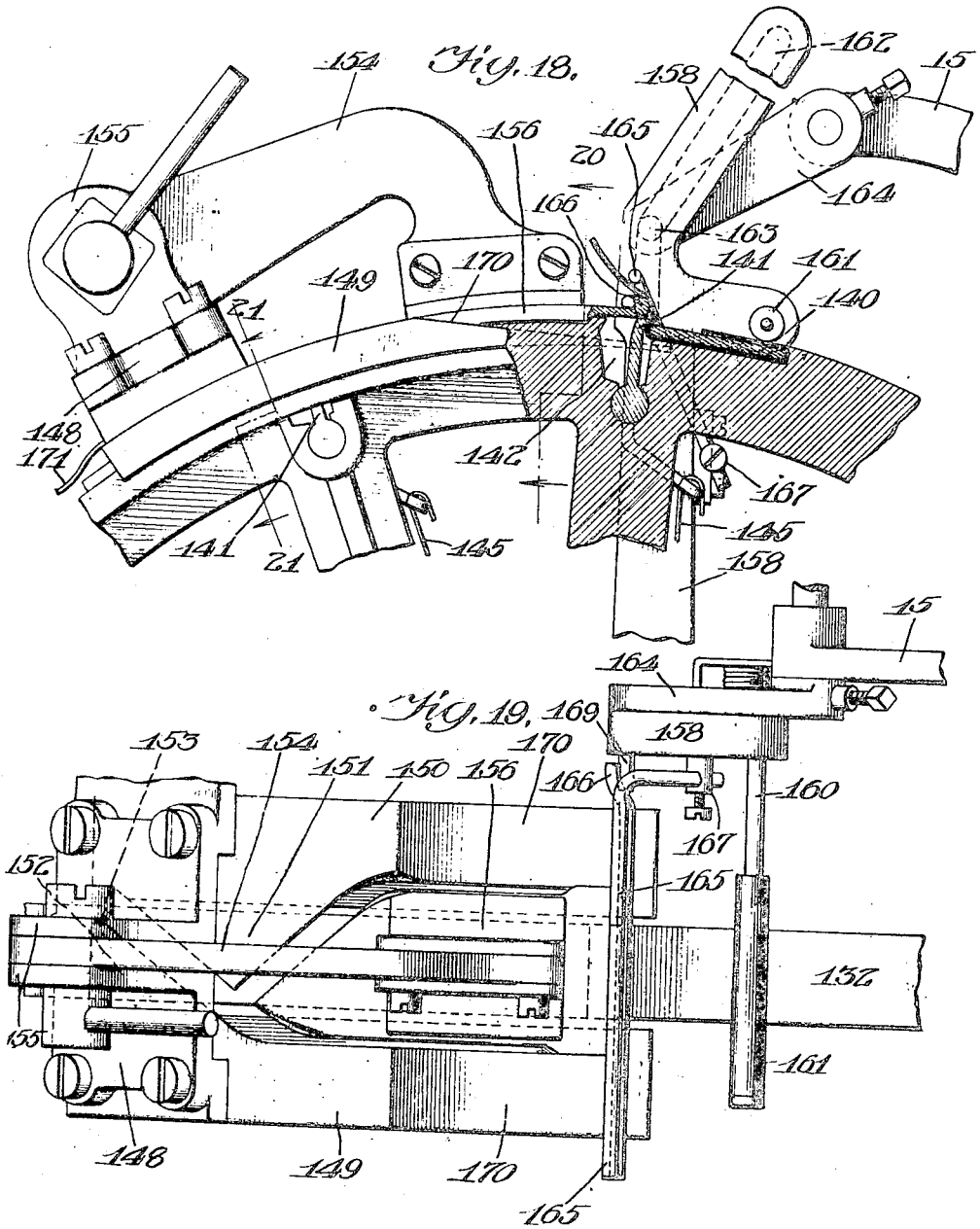

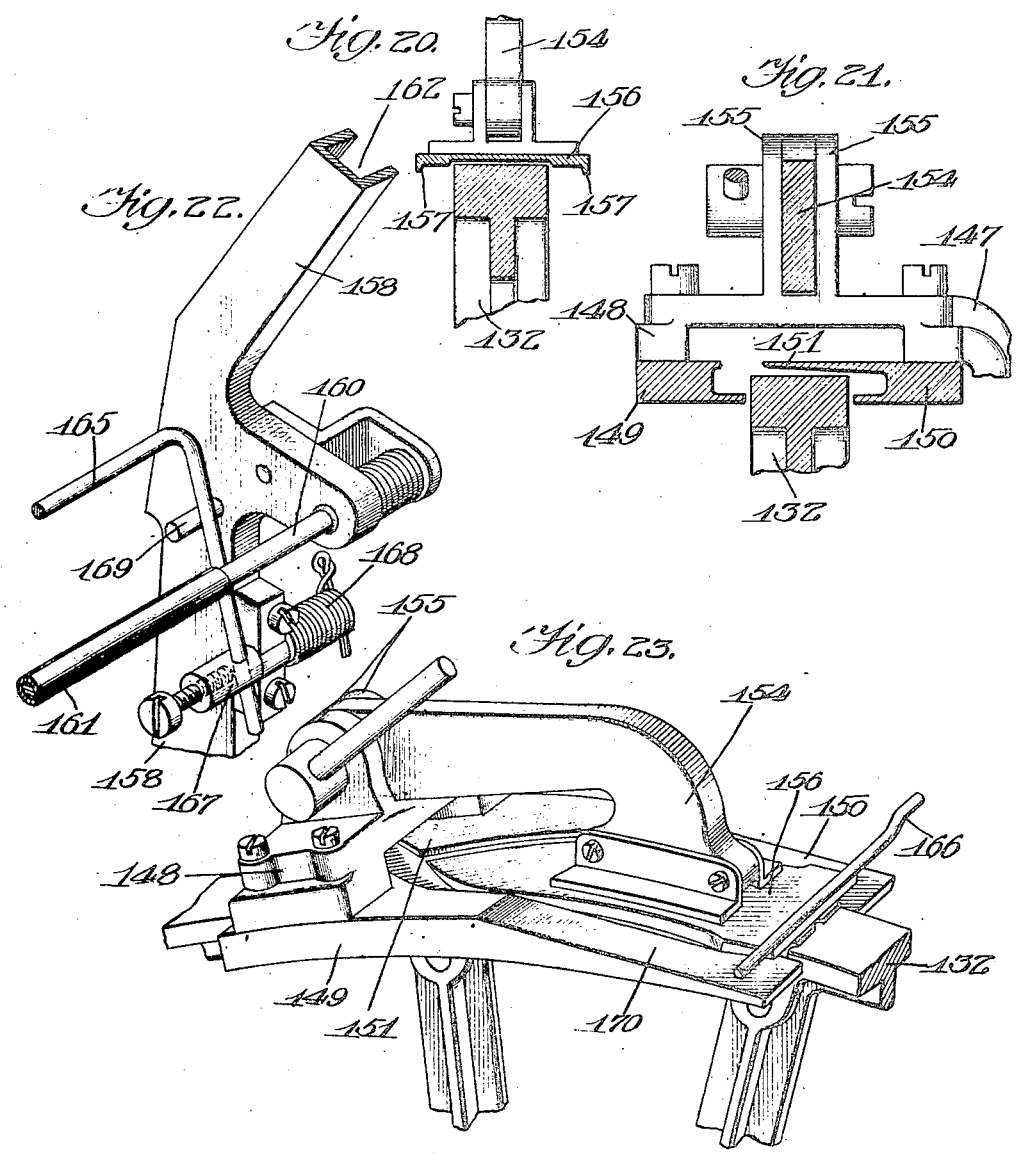

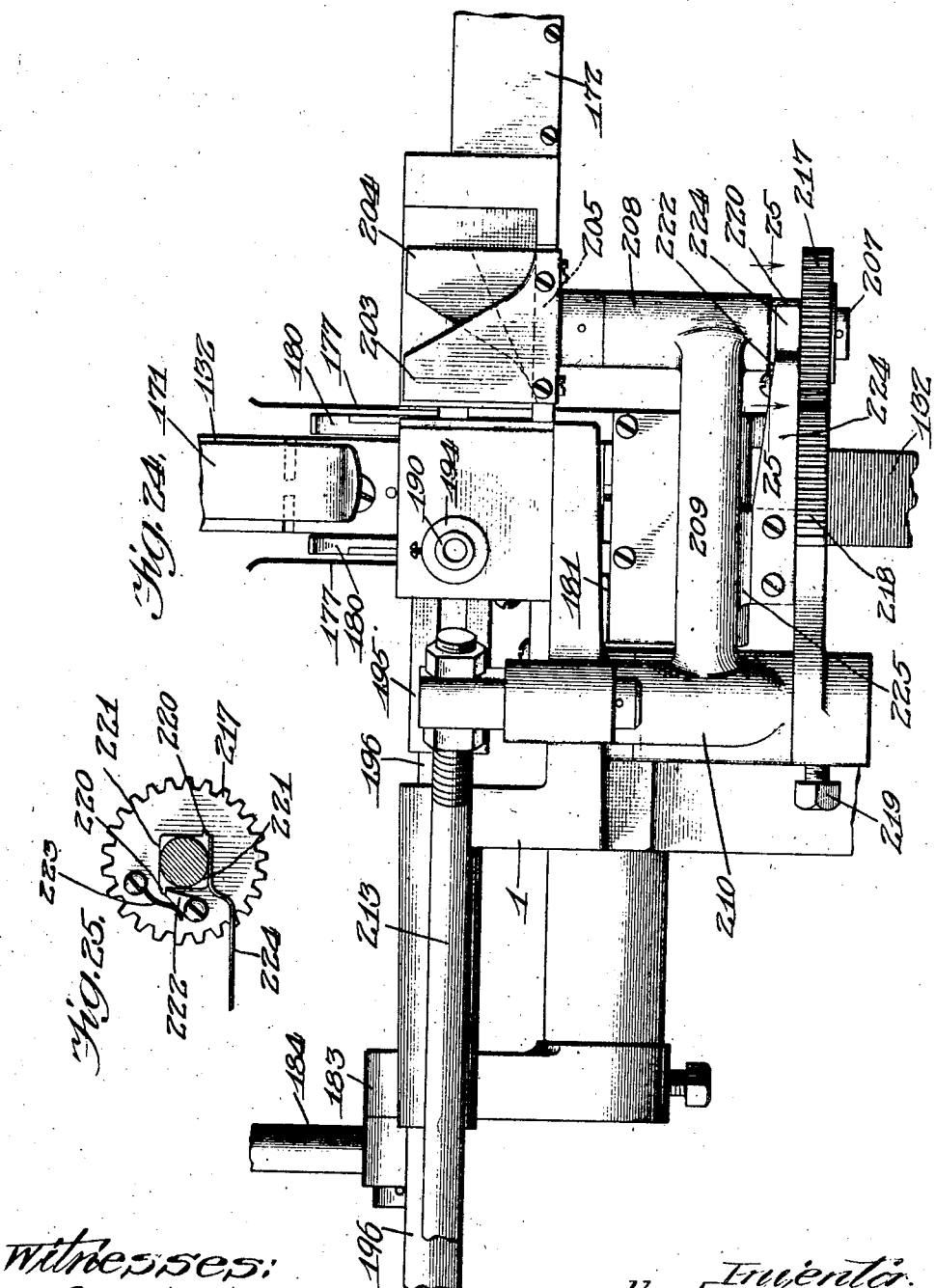

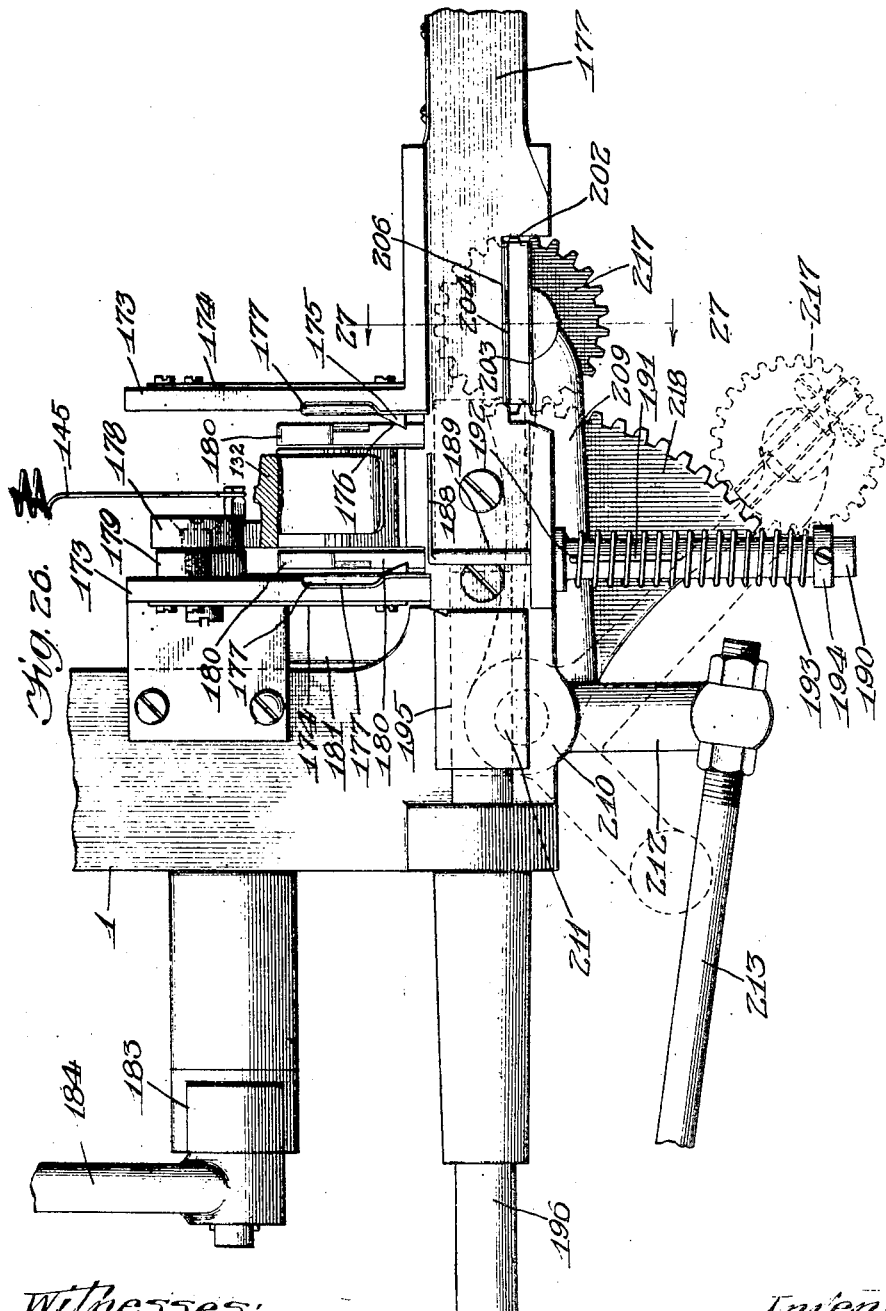

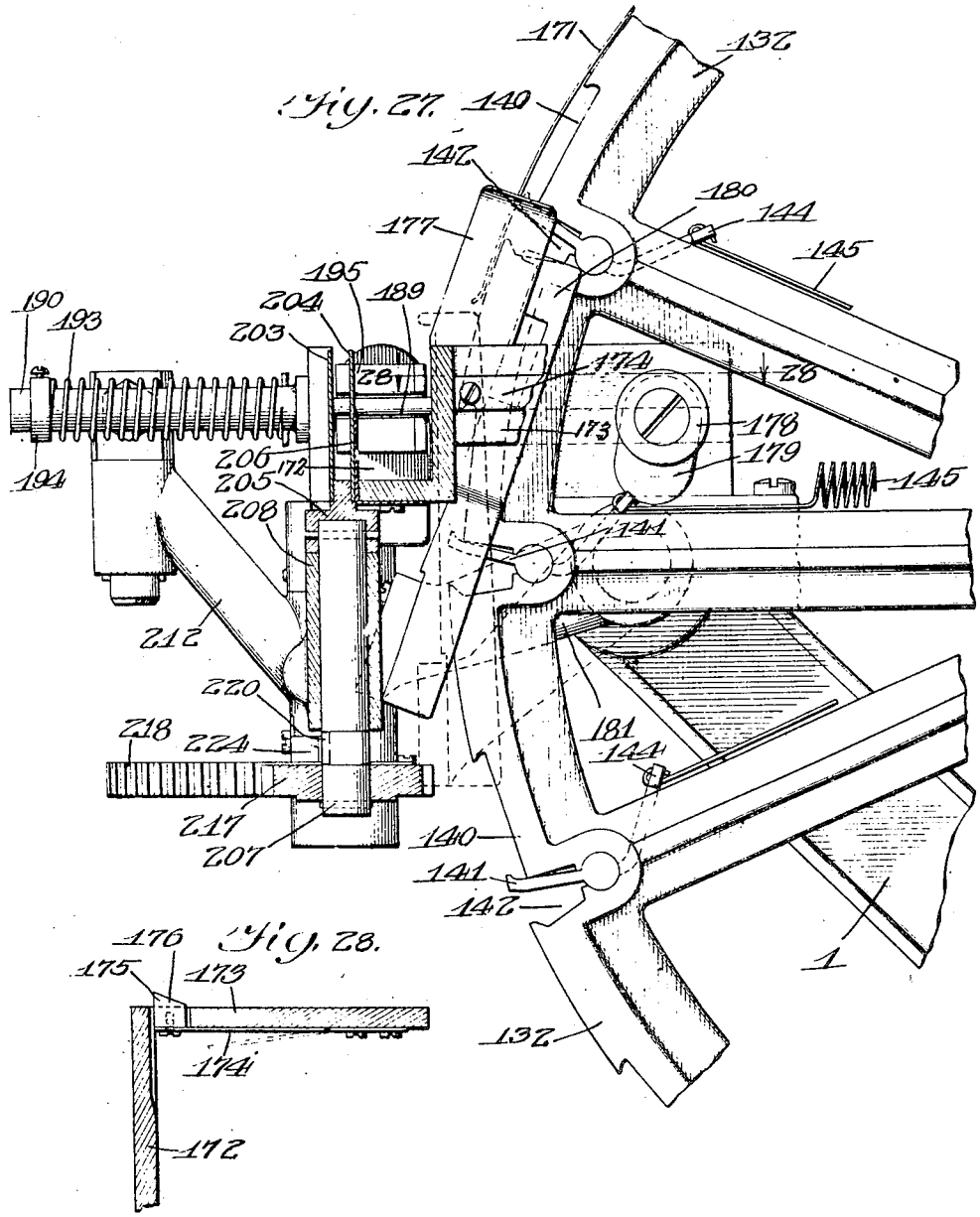

A. M. PRICE.
WRAPPING MACHINE.
APPLICATION FILED SEPT. 13, 1905.

931,646.

Patented Aug. 17, 1909.
16 SHEETS—SHEET 15.

Witnesses:
Robert H. Weir
W. Perry Hahn

Inventor
Albert M. Price
By James Addington
Attorneys

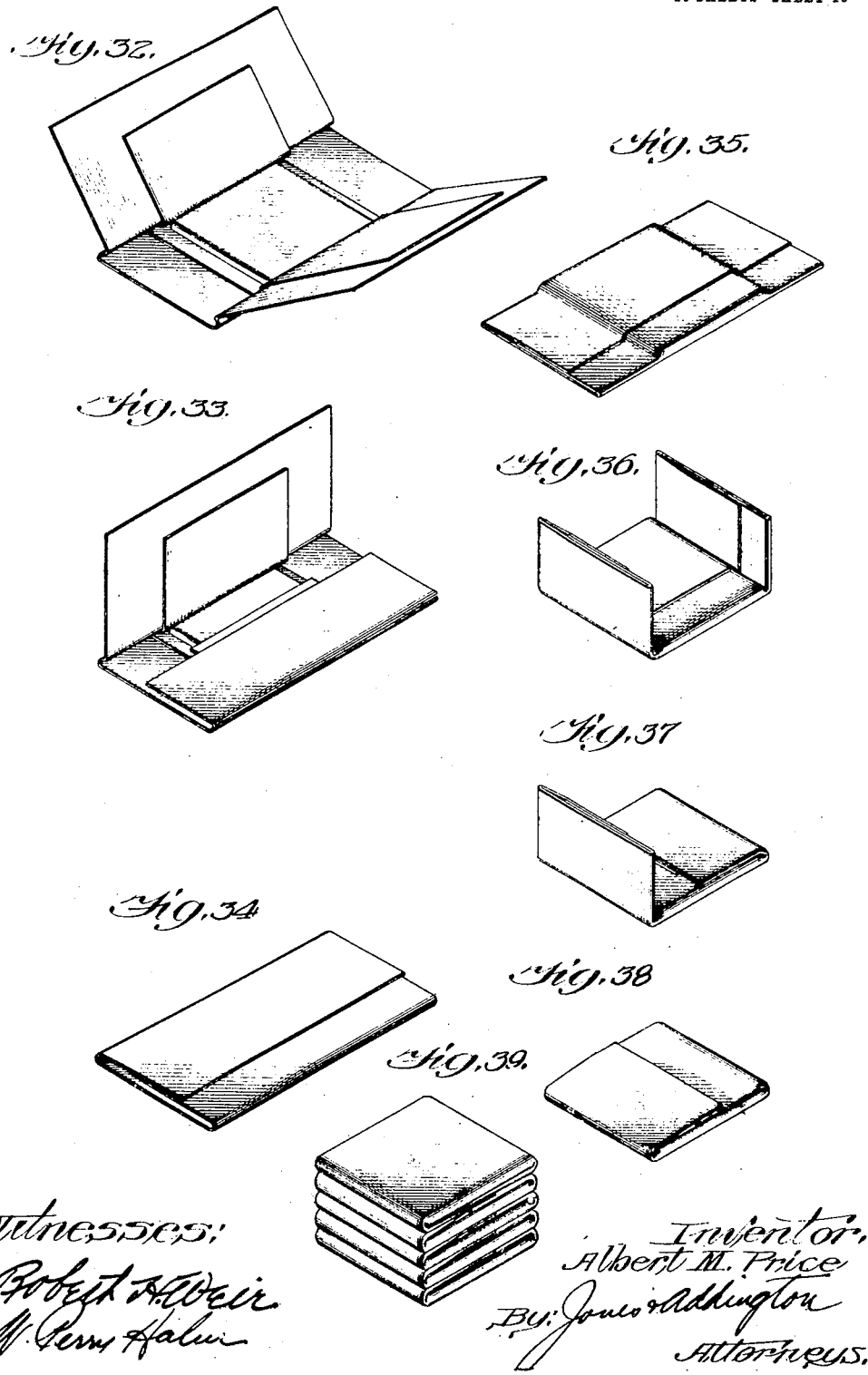

UNITED STATES PATENT OFFICE.

ALBERT M. PRICE, OF ELGIN, ILLINOIS, ASSIGNOR, BY MESNE ASSIGNMENTS, TO ADOLPH E. BRION, OF NEW YORK, N. Y.

WRAPPING-MACHINE.

No. 931,646.  Specification of Letters Patent.  Patented Aug. 17, 1909.

Application filed September 13, 1905. Serial No. 278,338.

*To all whom it may concern:*

Be it known that I, ALBERT M. PRICE, a citizen of the United States, residing at Elgin, in the county of Kane and State of Illinois, have invented new and useful Improvements in Wrapping-Machines, of which the following is a full, clear, concise, and exact description, reference being had to the accompanying drawing, forming a part of this specification.

My invention relates to improvements in wrapping machines, and especially to machines for wrapping sticks of chewing gum, or like articles of uniform size, which will receive the articles in rapid succession, wrap the same and finally discharge the wrapped articles or packages in bundles of any desired number, with the label of the two outer packages turned outwardly.

One of the principal objects of my invention is to provide a machine of this character in which the number of reciprocating and intermittently rotating parts are reduced to a minimum, whereby a high rate of speed may be obtained without danger of breaking the numerous parts and whereby the wrapping of the article will be facilitated.

In the description of my invention, while I refer continually to the article to be wrapped as a piece of gum, it will be understood that this is merely used for the purpose of illustration and that any other article may be wrapped if desired.

I have illustrated the preferred embodiment of my invention in the accompanying drawings, in which—

Figure 1:
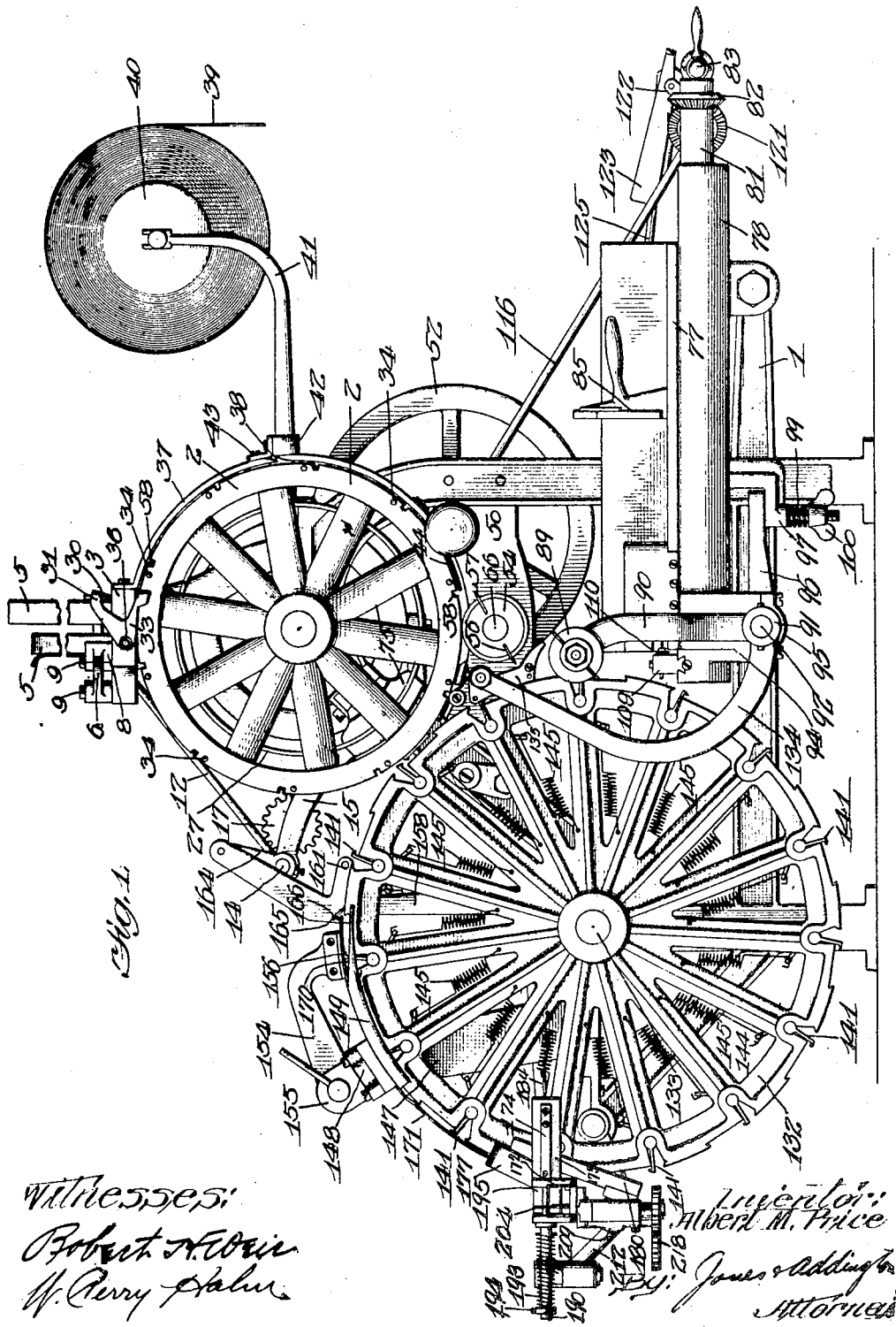
Figure 2:
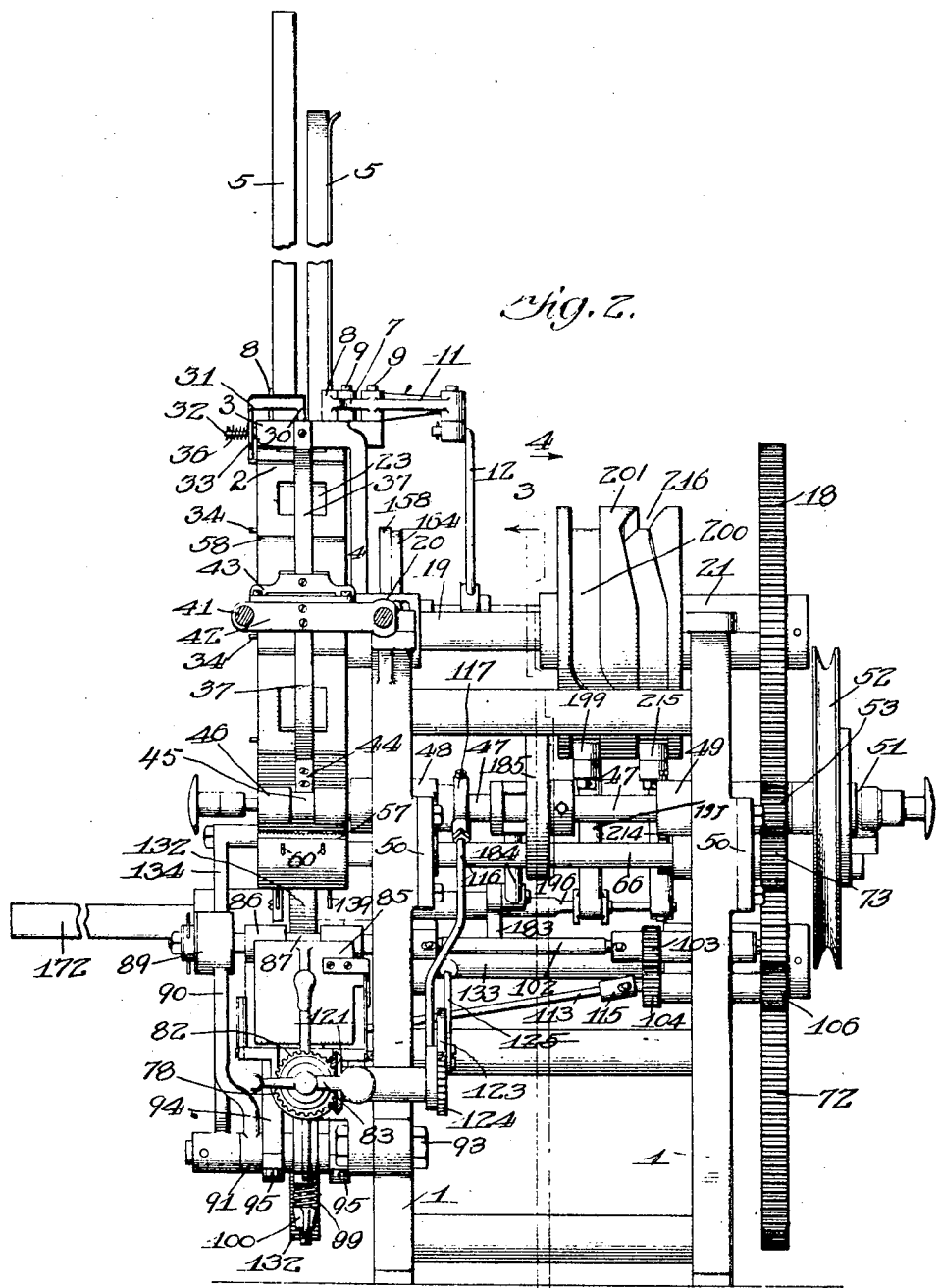
Figure 3:
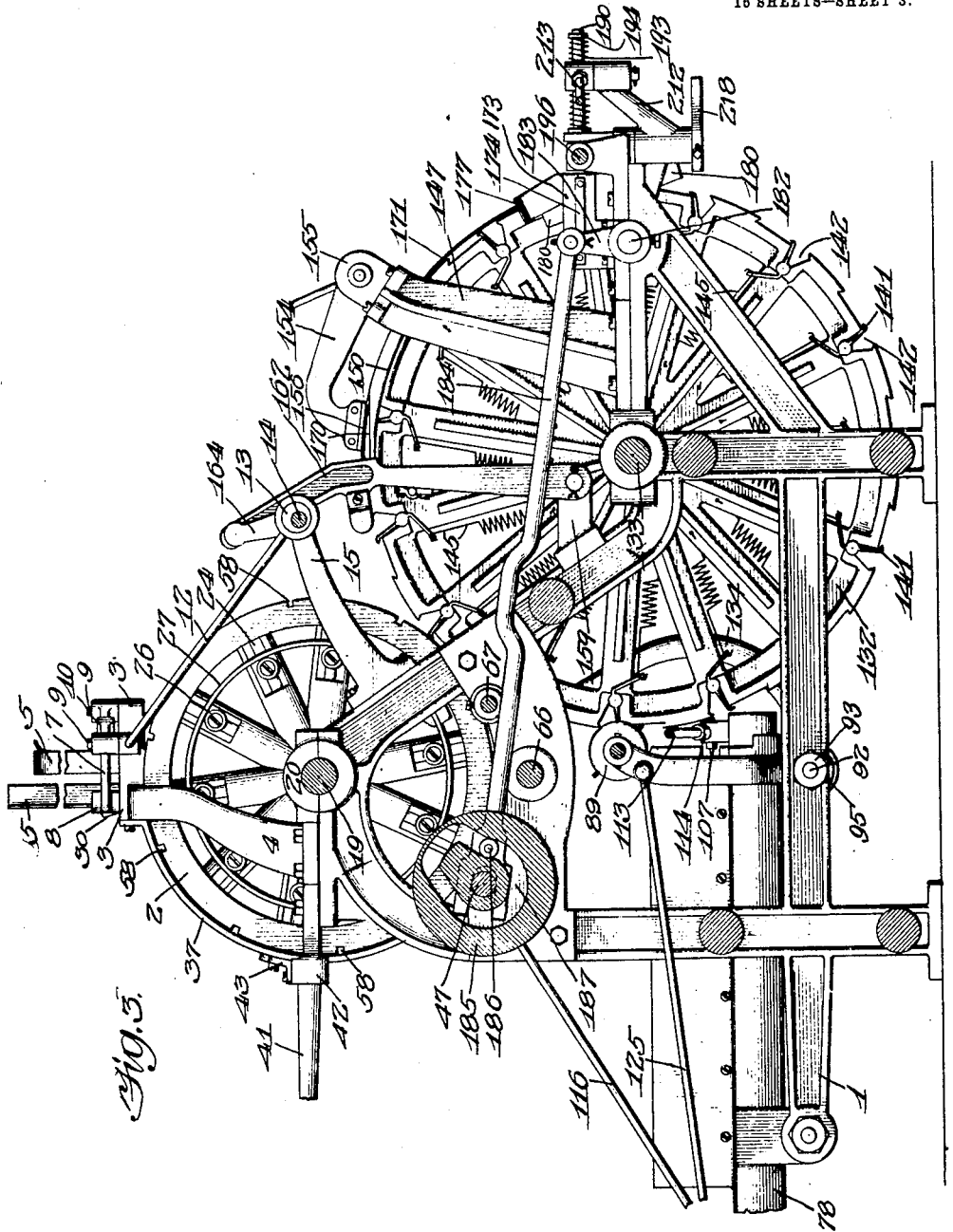
Figure 4:
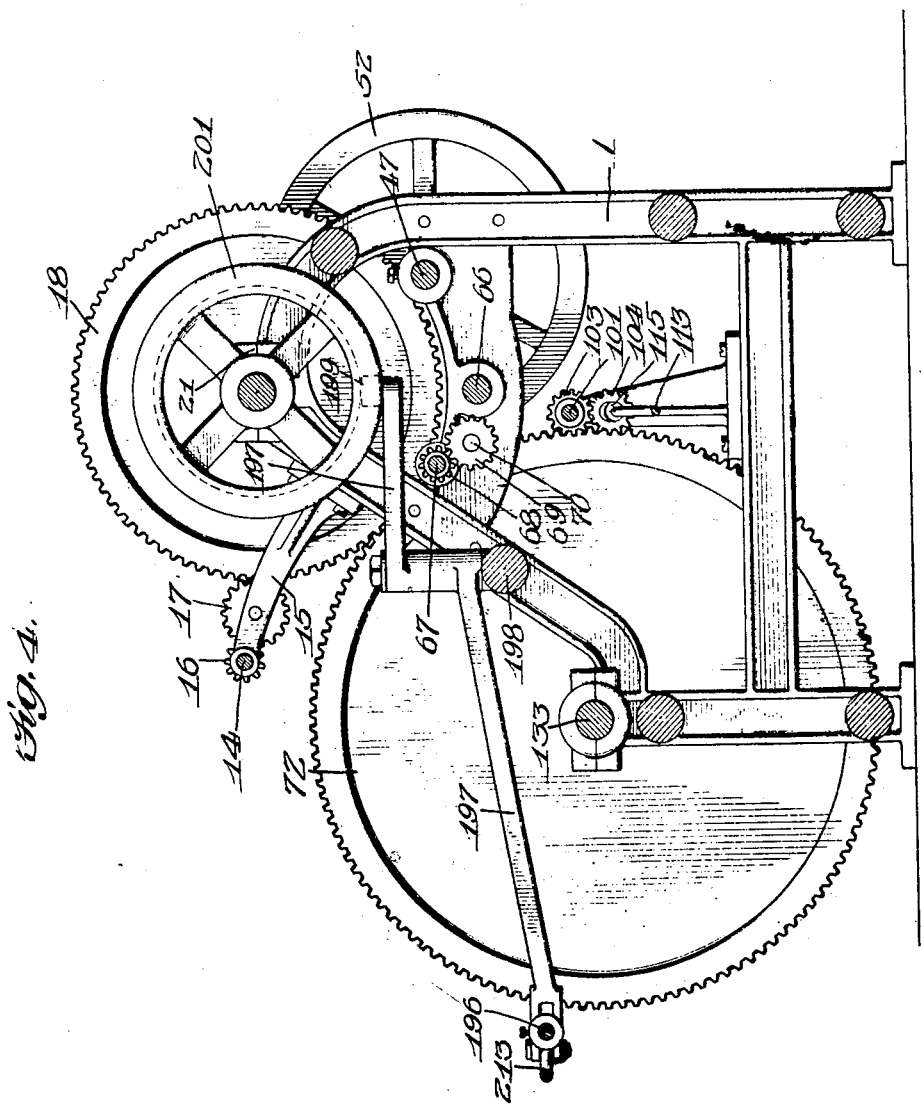
Figure 29:
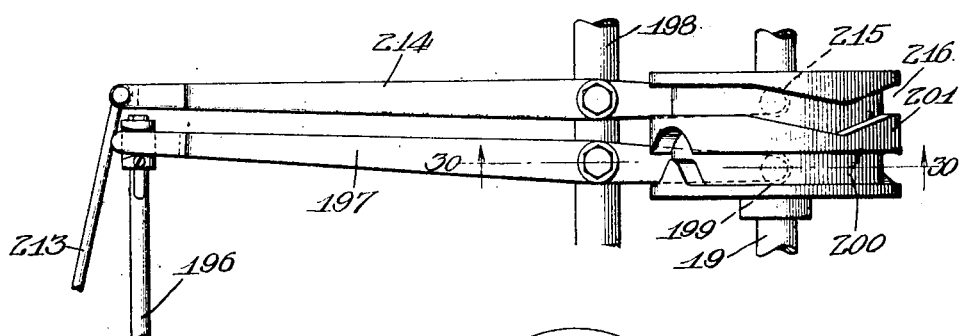
Figure 30:
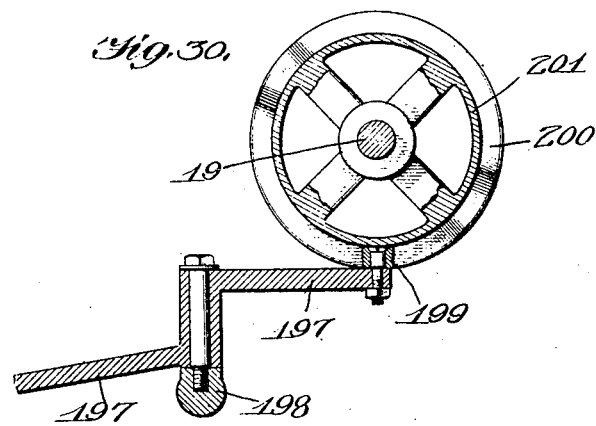
Figure 31:
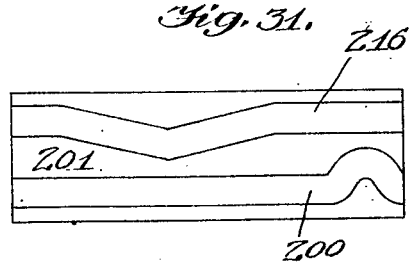

Figure 1 is a side elevation of my machine; Fig. 2 is a rear elevation of the machine; Fig. 3 is a section taken on the line 3—3 of Fig. 2; Fig. 4 is a section taken on the line 4—4 of Fig. 2; Fig. 5 is an elevation of a side of the machine, opposite that shown in Fig. 1; Fig. 6 is a detail view showing means for delivering the gum to the machine; Fig. 7 is a plan view of the device shown in Fig. 6; Fig. 8 is a detail section, taken on the line 8—8 of Fig. 7; Fig. 9 is a like view showing the feeding-wheel in a slightly advanced position; Fig. 10 is a detail view partially in section, showing the label feeding device; Fig. 11 is a detail view of a part of the label feed controller; Fig. 12 is a partial sectional view of the feeding-wheel and receiving wheel, showing the means for carrying the wrapping label on the receiving-wheel, the cutting mechanism for cutting the inner wrapper and the means for feeding the labels; Fig. 13 is a detail view of the needle shown in Fig. 12; Fig. 14 is a section taken on the line 14—14 of Fig. 10; Fig. 15 is a partial section of the label feed controller pawl; Fig. 16 is a partial section on the lines 16—16 of Fig. 11; Fig. 17 is an elevation of the rolls for holding the labels on the receiving-wheel; Fig. 18 is a detail elevation, partly in section, of the paper folding mechanism; Fig. 19 is a plan view of the mechanism shown in Fig. 18; Fig. 20 is a section taken on the line 20—20 of Fig. 18; Fig. 21 is a section taken on the line 21—21 of Fig. 18; Fig. 22 is a detail perspective of the mechanism for making the rear fold; Fig. 23 is a detail perspective of the stationary folding mechanism; Fig. 24 is a detail front elevation of the assembling mechanism; Fig. 25 is a section taken on the line 25—25 of Fig. 24; Fig. 26 is a plan view of the assembling mechanism; Fig. 27 is a section taken on the line 27—27 of Fig. 26; Fig. 28 is a section taken on the line 28—28 of Fig. 27; Fig. 29 is a plan view of the cam wheel and the arms or levers for operating parts of the assembling mechanism; Fig. 30 is a section taken on the line 30—30 of Fig. 29; Fig. 31 is a developed view of one-half of the cam shown in Fig. 28; Figs. 32 to 38 are perspective views of the gum and wrapper, illustrating the work performed by the machine; and Fig. 39 is a perspective view of a completed bundle of packages as the same is delivered from the machine.

An understanding of the construction and operation of the machine will be facilitated by reference to Figs. 32 to 39 of the drawings, illustrating the various foldings to which the wrapper is subjected and the form in which the bundle of packages is finally delivered. Taking these figures in their order, the first shows the stick of gum as it would appear when first deposited in the receiving-wheel. The second shows the first fold of paper turned down over the top of the stick of gum. The third figure shows the other fold of the paper turned down over the top of the gum. The fourth figure shows the paper creased along the ends of the gum previous to entering the end folding device. The fifth figure shows the two ends of the wrapper turned up. The sixth figure shows one end folded down, and the seventh figure shows the gum finally inclosed in its wrapper. The last figure shows the complete bundle, as it is delivered from the machine, and it will be noted that the top package of gum has been reversed, so that a smooth appearance will be presented by both sides of the bundle, and also in event of printing upon the labels, the printing will appear on both sides of the bundle.

The general arrangement of my machine consists as follows: A suitable frame 1 is provided, upon which all the parts are mounted. What I term a magazine, in which the gum is placed by the operator, is provided, from which the same is delivered to a continuously rotating feeding-wheel. As the sticks are carried around by the feeding-wheel, a strip of paraffin paper is placed over them, and when they reach a predetermined point, this strip is cut into proper lengths to cover one stick of gum when folded about it. The sheets of paper or labels in which the sticks of gum are wrapped have been previously cut to the proper size, and are placed in a paper feeding mechanism, which, as the machine operates, delivers one sheet at a time to a continuously rotating receiving-wheel. This wheel, in revolving, carries a label to a point where, at a predetermined time, the feeding-wheel is adapted to deliver a stick of gum and a sheet of paraffin paper to the receiving-wheel, placing the gum on top of both sheets of paper. The receiving-wheel then takes up the gum and its wrappers, and as it revolves passes the wrapping sheets through a suitable folding mechanism which first turns down the two side folds and then turns in the two end folds. From the receiving-wheel, after the wrappers have been properly folded about the stick of gum, it is delivered to an assembling mechanism, and when five packages of gum have been received by this mechanism, one of the packages is reversed, and the entire five are then delivered in the form of one bundle to the operator, who removes same from the machine and places it in a suitable receptacle. It will be understood that the operating parts of this machine are in constant motion and the operations hereinafter described are all simultaneously effected, as, for instance, a stick of gum is being delivered from the magazine to the feeding-wheel at the same time a stick is being delivered from the feeding-wheel to the receiving-wheel and so on throughout the machine.

In order that the details of construction, the mode of operation of the various mechanisms shown in the drawings may be more fully understood, and the description thereof simplified, I have divided the description into four parts, namely, the mechanism for feeding the articles to be wrapped, together with the inner wrapper; the mechanism for feeding the labels in which the articles are to be wrapped; the folding mechanism which wraps the sheets of paper about each article; and finally, the assembling mechanism which receives the wrapped articles from the folding mechanism, and delivers the same in a completed bundle.

*Feeding mechanism for article and inner wrapper.*—The article feeding mechanism consists of a magazine and a feeding-wheel 2. The magazine consists essentially of a base 3, which is mounted upon an arm 4 extending upwardly from and supported upon the frame 1, as shown more particularly in Fig. 3. This base is arranged immediately over the feeding-wheel 2, and has projecting upwardly therefrom two angle pieces, 5, which form a receptacle for the gum. By this arrangement, the sticks of gum may be inserted from the top of the magazine and guided by insertion of the fingers between the angle-pieces 5. The base 3 has extending through it an opening, through which the pieces of gum are fed by gravity into the receptacles of the feeding-wheel.

Pivotally mounted upon the base 3 are a pair of arms 6 and 7, the outer ends of which are formed to provide right-angle corners, as at 8, (Fig. 7) adapted to engage two opposite corners of the column of sticks of gum. These arms are preferably pivoted upon upwardly projecting pins 9, and are provided with racks or gear segments 10, which mesh with each other, whereby when one arm is moved, the other moves with it. One of these arms 7 has formed integral therewith an arm 11, which is connected by a rod 12, to an eccentric 13 on the shaft 14, journaled in the arms 15, projecting from the frame 1. The shaft 14 has mounted upon one end thereof a gear 16, which meshes with a gear 17 mounted upon a stud projecting from one of the arms 15, and driven by the gear wheel 18. The rotation of the eccentric 13 will, at proper intervals, move the arm 11 and cause the arms 6 and 7 to move alternately toward and from each other, thus alining the pieces of gum one above the other.

The feeding-wheel 2 is preferably mounted upon one end of a shaft 19, journaled in suitable journals 20 and 21, mounted upon the frame 1, and is provided with a rim 22 (Fig. 12) in which at regular intervals throughout the same, are formed pockets or receptacles 23. The spokes of the wheel coincide with these pockets or receptacles, and are hollow, to receive rods 24, which are provided at their outer ends with plungers 25, arranged within the pockets 23. With its plungers at its innermost position, each pocket is of just sufficient depth to receive one stick of gum. On the inner side of each rod is mounted a small projecting roller 26, which is adapted to engage under a stationarily mounted ring 27, cut away at one point, as at 28, shown in dotted lines in Fig. 12, to permit the plungers at this point to move outwardly, the ring, during the rest of the rotation of the wheel, holding the plungers in their innermost position. Each plunger has secured thereto a small pin 29, which pierces the gum and serves to hold it from displacement while being transferred by the plunger from one wheel to the other. In order that the gum may readily enter the pocket 23 from the magazine, the base 3 (Figs. 6, 7, 8 and 9) has projecting therein a finger 30 carried by an arm 31. This arm is pivotally mounted upon a pin 32, which projects from the outer side of the base 3 and has formed integrally therewith a second arm 33 adapted to be engaged by the pins 34 projecting from the rim of the feeder-wheel, 2. The underside of the rear of the base 3 is preferably chambered or cut away, as at 35. As the feeder-wheel moves beneath the base 3 of the magazine, the weight of the gum will tend to cause the rear end of the gum to drop down into the pocket 23 and the wall thereof will engage the rear end of the gum and tend to shove it forward, at the same time one of the pins 34 has passed under the arm 33 and raised the finger 30, (Figs. 6 and 8) thus permitting the forward end of the piece of gum to pass beneath the inclined underside of the base, and said incline forces the gum down into the sockets 23 and against the pin 29, mounted on the plunger 25, causing the same to pierce and enter the gum. As soon as the extreme front edge of the gum has passed slightly beneath the point of the finger 30, the pin 34 passes from beneath the arm 33, thus permitting the coil spring 36 to force the finger 30 down against the gum just back of its front edge and prevent the second piece of gum from being carried forward under the incline 35 by the friction between the first and second pieces of gum (Fig. 9).

To the base 3 is secured a guard 37, which extends partially around the feeding-wheel and prevents the gum from being thrown out of the pockets by centrifugal force, as the wheel rotates. At an intermediate point 38 this guard is severed to permit the passage of the paraffin paper 39. This paper is preferably mounted upon a spool 40, which is carried by two arms 41, projecting from and supported by a bracket 42 mounted upon a frame 1. Immediately over the point 38 in guard 37 is a guide 43, through which the paper is adapted to be fed. The paper, after it has passed through the guide, is drawn along by the machine, and lays along the wheel over the gum. A portion of the guard 37 extends from the slotted guide 43 to a point beneath the wheel and serves the double purpose of retaining the gum in the pockets 23 and holding the paraffin paper against the surface of the rim of the wheel. The lower end of this portion is provided with a flexible spring-like extension 44, which is adapted to lie between the feeding-wheel 2 and the roller 45. The roller 45, as in Fig. 2, is provided with rubber coatings 46, which bear against the wheel 2 and cause the paper 39 to move therewith, as the wheel is rotated. Between these two rubber coatings, a space is left, which accommodates the spring-like extension 44, allowing the roller to engage the paper on either side thereof. This roller is suitably mounted upon a shaft 47, which extends from one side of the machine to the other, being suitably supported in journals 48 and 49, carried by a cross-piece 50, mounted upon the frame 1. The shaft 47 is the drive shaft of the machine and has mounted thereon and connected thereto by a friction clutch 51, of common form, a driving wheel 52, adapted to be connected by a belt to any driving power. The motion of the shaft 47 is transmitted through the pinion 53 mounted thereon to the gear 18, and thence to every part of the machine.

At a point beneath the feeding-wheel, is mounted a cutting roller 54, provided with a resilient or rubber covering 55, which bears against the wheel 2 and causes the paper 39 to move therewith at their point of tangency, thus holding the paper firmly at both ends of the length between the roller 45 and the roller 54, at the same time permitting it to constantly move forward with the feeding-wheel 2. As a roller 54 revolves, the knives 56 and 57, which are mounted upon its opposite sides, alternately enter grooves 58 in the feeding-wheel 2. The paper being held firmly on each side of the groove 58, is punctured by the series of points (Fig. 2) comprising the saw-like edges of the knives and as these points are pushed farther through the paper, the punctures are enlarged until they extend entirely together, thus completely severing the paper. In order that the forward end of the paper fed from the roll 39 may not be carried downward by the roller 54, but shall be passed onward with the wheel 2 above the guide 59, the roller 54 is provided with four plungers, 60, one pair of which are arranged upon each side thereof (Figs. 2 and 12). The plungers are held in their outermost position by springs 61 arranged between the head 62 and the screw-plug 63, and as the plunger engages the feeding-wheel 2, the spring will permit the plunger to move back, at the same time holding it against the wheel. The plunger moves inwardly, as it engages the wheel, but as it passes the tangential point it again moves outwardly, holding the forward end of the paper against the wheel 2, until it passes above the guide 59. The guide 59 has attached thereto a spring 64, which extends along the wheel 2, almost to a point where the same delivers the gum to the receiving-wheel, and serves the double purpose of preventing the gum from dropping from the pockets in the wheel 2, and prohibiting the cut-off portion of the paraffin paper from adhering to and becoming rolled upon the roller 65.

The roller 65 constructed similar to the roller 45, that is, having two resilient coverings, between which the spring 64 is adapted to lie, rests against the feeding-wheel 2, at a point a little in the rear of the tangential point where the feeding-wheel delivers the gum to the receiving-wheel, and aids in advancing the cut paraffin paper along until it, with the gum, is delivered to the receiving-wheel. The roller 54 and the roller 65 are mounted upon the ends of shafts 66 and 67, respectively, which are mounted in suitable journals in the cross-pieces 50 secured to the frame 1. The shaft 67 has mounted on one end thereof the pinion 68, which meshes with the pinion 69, on shaft 70, on the opposite end of which is mounted the pinion 71, which, in turn, meshes with the gear wheel 72. The shaft 66 has mounted thereon a gear 73, which meshes with the gear 18 and is driven thereby.

At the point at which the plungers 25 are adapted to force the stick of gum from the pockets 23, and deliver the same to the receiving-wheel, as before described, the stationary ring 27 is cut away, (Fig. 12) and a stationary cam 74 is provided. This cam or guide is provided with a groove 75, in which the rollers 26 on the rods 24 are adapted to move, and as these rollers move in this guide, a portion thereof, 76, causes the rods to move outwardly, moving therewith the plunger, and delivering the gum with the cut sheet of paraffin paper and label to the receiving-wheel. The methods used in handling the label up to this point are given under the heading "Label feeding mechanism." The cam or guide 74 is rigidly mounted upon a portion of the frame 1, and also serves as a support for the annular ring 27.

*Label feeding mechanism.*—The label feeding mechanism is arranged at the lower rear end of the machine, and is adapted to hold a number of labels, which have been previously cut to the size desired to be used in the wrapping and deliver them one at a time to the receiving-wheel. This mechanism comprises a receptacle 77 having a bottom channel 78, formed therein, in which is mounted a screw-threaded shaft 79, journaled at its forward end in the journal bearing 80, and near its rear end in the journal bearing 81. Upon the rear end of the threaded shaft is mounted a suitable bevel-pinion 82, and a crank-arm 83. This screw-threaded shaft engages in a thread-cut in the lower portion 84 of a follower 85, and serves to advance the same to move the paper into engagement with the frictional feed-rollers 86, which are mounted upon the shaft 87, carried in journal bearings 88 and 89, formed upon the ends of the yoke 90. The two arms of the yoke 90 are formed integral with the sleeve 91, which is mounted upon the stud 92, which is in turn secured to the frame 1, by the nut 93. The forward end of the paper receptacle is mounted by means of the downwardly projecting portions 94 upon the hollow sleeve 91 of the yoke and is held in such position by the caps 95. The yoke 90 is mounted so that it can turn freely on the stud 92 and within its bearings formed in the projections 94 of the paper receptacle. The rearwardly extending arm 96 is rigidly mounted upon the sleeve 91 of the yoke and is adapted to engage a lug 97 mounted on the bottom of the paper receptacle. A pin 98 extends from the arm 96 through the lug 97, and is provided on its underside with a coil spring 99, and a thumb-nut 100 for adjusting the tension of the spring. By this means, the rollers 86 are maintained in engagement with the paper with sufficient pressure to cause them to pull the sheets of paper off, one at a time, as the rollers revolve.

The shaft 87 is driven by a shaft 101 through the medium of a shaft 102, having at each end thereof a universal coupling. The shaft 101 has mounted thereon a pinion 103, which meshes with the gear 104, mounted on the shaft 105, on the other end of which is mounted the gear 106, meshing with the gear 72.

The rollers 86 have their surfaces composed partly of rubber or other adhesive material and partly of a smooth non-adhesive material (Figs. 10 and 12) and their circumferences are so proportioned to the length of the label that the rear end of each label will, as it is removed, come in contact with the non-adhesive portion only. By this construction, the next sheet will not be started as soon as the preceding sheet is removed, but when the rubber or frictional surface comes in contact with it.

It is a well known fact, when an effort is made to remove the first of a plurality of sheets of paper by frictional means bearing against the surface of said first sheet, that two or more sheets will, in all probability, be removed, unless some means is provided for holding all but one sheet. In my present invention I provide a holding means in the form of a needle 107, which is mounted at the forward end of the receptacle 77, and against which the sheets of paper are forced by the follower 85. This needle is of sufficient length to extend through a number of the first sheets and punctures these sheets a slight distance from the lower edge. While the friction of the roller against the first sheet is sufficient not only to overcome the resistance of the friction between the first and second sheet, but also to tear out the small portion necessary to release the sheet from the needle, the friction between the first and second sheet would not be sufficient to overcome the friction between the second and third sheet and also tear the second sheet from the needle. This is due to the fact that the frictional pull of the rubber against the paper is greater than that of paper against paper. It has been found, however, that if a stationary needle is used, the point of the needle in being forced through one sheet into the next tends to draw the fine vegetable fibers of which the paper is composed, into the perforation being made in the second sheet. These fibers are apparently carried by the point of the needle from one sheet to the next until they become clogged and prevent the needle from fulfilling its function. I have, accordingly, mounted the needle upon a small rotating shaft 108, supported in a journal 109 and provided with a bevel-gear 110, which is adapted to mesh with a beveled gear 111, mounted upon the end of a shaft 112, connected with and driven by the shaft 105, through the medium of a driving rod 113, and the universal couplings 114 and 115. By this means the needle is rotated, which causes the point thereof to clear itself of the small fibers which would otherwise stick to it, as the paper is torn therefrom. It will be understood that any form of point adapted to bore into the paper may be used, but the screw-threaded form shown in Fig. 13 is preferred.

In order that the shaft 79 may be rotated and thereby advance the follower 85, the following mechanism is provided. A rod 116 is provided at one end with a collar 117, mounted upon an eccentric 118, carried by the shaft 47. The opposite end of the rod 116 is slotted, as at 119, whereby the same will fit over the shaft 120, of a bevel-gear 121 and be supported thereby. The end of this rod 116 is provided with an upwardly extending projection 122, on which is pivotally mounted a pawl 123, shown more particularly in Fig. 15, adapted to engage the teeth on a notched wheel 124, on the shaft 120. As the rod 116 is reciprocated by the eccentric 118, it reciprocates the pawl, and as the pawl moves forward, it rotates the notched wheel 124 and therewith the bevel-gear 121, which, in turn, rotates the bevel-gear 82 and the screw-threaded shaft 79. As the sheets of paper vary in thickness, it is impossible to arrange the pitch of the screw-thread on the shaft, so that it will feed the follower 85 forward exactly the thickness of one sheet of paper for every reciprocation of the rod 116. It is not even possible to get this mechanism to average correctly for any given length of time, as different lots of paper will average a different thickness to the sheet. For this reason the pitch of the screw on the shaft 79 is made approximately twice as great as would be necessary were it actuated by each reciprocation of the rod 116, and I have provided the following regulating mechanism. A rod 125 is connected to the yoke 90 by an arm 126, and at its opposite end is slotted, as at 127, which slot engages over a circular projection 128, mounted upon the pawl 123. The hole in the pawl 123 is made oblong to enable it to have a slight reciprocating motion on the screw 129, on which it is pivoted. A coiled spring is mounted in the hole 130, and held in position by the screw 131, so that normally the pawl is held rearwardly against the screw 129, as shown in Fig. 15. When the paper is carried forward by the follower 85, it bears against the rollers 86 and as the pressure increases, the rollers 86, together with the yoke 90, are pressed forward in opposition to the tension of the spring 99. The yoke 90 carries forward the rod 125 and when this rod is drawn forward to such an extent that it intercepts the backward motion of the pawl 123, at the rear end of the stroke of the rod 116, the pawl 123 will fail to engage the next consecutive tooth of the wheel 124, as shown in Fig. 11. By this arrangement the rotation of the toothed wheel 124 is intermittent and only occurs when the tension of the paper becomes slightly less than desired, and it becomes necessary to move the follower 85 forward slightly.

Mounted to rotate tangentially with the feeding-wheel 2 is a continuously rotating receiving-wheel 132, which is mounted upon the shaft 133 driven by the gear 72. The construction and operation of this receiving-wheel will appear more fully hereinafter. As the paper leaves the feed-rollers 86, it is necessary that some means be provided to guide and hold the same upon the receiving-wheel 132, until the gum is delivered thereto, which itself aids in holding the paper upon the wheel. Mounted upon the outer end of the stud 92, upon which is carried the yoke 90, is an arm 134, which carries the frame 135, within which are supported suitable resilient rollers 136, adapted to bear against the periphery of the receiving-wheel 132, and hold the paper thereon. The frame 135 comprises a pair of sides 137 and 138, having backwardly extending tail-pieces 139 at their lower ends and between which are mounted the four rollers 186 (Figs. 12 and 17). These rollers bear upon the periphery of the receiving-wheel 132, and as the paper is carried up by the feed-rollers 86 the upper edge thereof is guided by the tail-pieces 139 and the paper passes under the rollers and is held by them upon the periphery of the receiving-wheel.

*Folding mechanism.*—The folding mechanism consists of the receiving-wheel 132, to which the sticks of gum and sheets of paper are delivered, and the devices for folding the paper as the wheel rotates. The wheel 132 has formed on its periphery a series of pockets 140 adapted to receive the sticks of gum and their wrappers, which are held in these pockets by fingers 141, mounted in openings 142 in the wheel, which fingers form one wall of the pockets 140. The opposite wall of the pocket is undercut to form a lip 143 so that when the gum is forced into the pocket and the finger grips the same, the opposite side of the gum is forced beneath the lip 143, and the tendency of the gum to fly outwardly is prevented. The finger 141 is held normally in a closed position by means of an arm 144, formed thereon, to which is connected one end of a coiled spring 145, the opposite end thereof being connected to a spoke of the wheel or to any other convenient point. The rotation of the receiving-wheel is so timed that, as the sheets of paper are fed upwardly by the rollers 86, and between the rollers 136 and the receiving-wheel, they will be equally spaced forward and backward over the pockets 140. The receiving-wheel 132 and the feeding wheel 2 are so timed, relative to each other, that the pockets 140 and the pockets 23 will register at the tangential point. At this point the plunger 25 of the feeding-wheel moves outwardly and forces a stick of gum, which is contained in the pocket 23, into the pocket 140 on the receiving-wheel. As a pocket on the receiving-wheel approaches the tangential point, in a position to receive the stick of gum, the arm 140 of the finger 141 engages a roller 146 mounted upon the frame 1 and the pocket is opened for a sufficient length of time to permit the gum to be forced into the pocket on top of the two wrappers which lie thereon. The downward movement of the plunger 25 forces the gum in on the paper and the finger 141, after the arm 144 has moved off of the roller 146, immediately springs closed again and the gum and paper are held in position on the receiving-wheel. The stick of gum and paper are now in the position shown in Fig. 32.

A support 147, which extends upwardly from the frame 1, has a projection 148, which extends over the receiving-wheel 132 and carries the rearwardly extending stationary folding members 149 and 150. The stationary folding member 150 extends for a short distance along the periphery of the receiving-wheel 132 and is secured in position at its front end beneath the projection 148. This stationary folding member has a projecting portion 151, which extends over the receiving-wheel and gradually increases in width, Fig. 19, until it extends nearly across the face of the receiving-wheel. The stationary folding member 149 is of the same general construction as the member 150 and has a projection 152, extending over the receiving-wheel in a similar manner to the projection 151, but in the opposite direction and located at a point slightly farther around the circumference of the receiving-wheel, its greatest width being at the point 153. The projection 151, after it has reached its greatest width, gradually diminishes to accommodate the increasing width of the projection 152. Carried upon an arm 154, which, at one end, is mounted between the lugs 155, extending upwardly from the projection 148, is a stationary folder and creaser 156, which lies between the stationary folders 149 and 150. The under-surface of this folder and creaser 156 is circular to conform with the periphery of the receiving-wheel, and is provided with downwardly extending portions 157 for creasing the wrapper as shown in section in Fig. 20. The stationary folders 149 and 150 have, in general, a channel-shaped section, as shown in Fig. 21, which channel-shaped section is curved to conform with the periphery of the receiving-wheel, to permit the passage therethrough of the projecting ends of the gum as the same is carried by said receiving-wheel.

An upwardly extending lever 158 is pivoted at its lower end to the bracket 159, mounted upon the frame 1. This lever carries a spindle 160, on which is mounted a roller 161, extending across the receiving-wheel in the rear of the stationary folding members 149 and 150, and the stationary folder and creaser 156 (Figs. 18, 19 and 22). The upwardly extending portion of the lever 158 has formed therein a groove 162, in which works a roller 163, mounted upon the crank 164, on the shaft 14. As this crank revolves, the roller causes the upper end of the lever 158 to reciprocate, which, in turn, reciprocates the roller 161 over the receiving-wheel 132. This movement is so timed that as a pocket containing the gum and wrappers is immediately back of the stationary folder 156, the roller moves forwardly or in the direction in which the wheel is traveling, but at a more rapid rate and folds down the rear flap of the wrapper. At the same time, in order that the front flap of the wrapper may not interfere with the folding of the rear flap, an arm 165, which is also carried by the lever 158, but which is held in position in advance of the roller 161, engages beneath the front flap of the wrapper and folds the same back over a rod 166, Fig. 23, mounted on the front end of the stationary folder and creaser 156. As the lever 158 continues to advance, the arm 165 is stopped in its forward motion by striking against the rod 166, and swings on a pivot 167. A spring 168 tends at all times to hold the arm 165 forward against a pin 169, except at such time as it is retarded by the rod 166, as above described. As the receiving-wheel revolves, it passes the gum, together with its wrapper, beneath the folder and creaser 156, thus folding down the front fold, giving the partly formed package an appearance as shown in Fig. 34. As the wheel continues to revolve, and the gum and its wrapper pass farther under the folder and creaser, 156, the wrapper is creased along the ends of the gum and assumes the appearance shown in Fig. 35. The portion of the wrapper beyond the ends of the piece of gum now rest on the lower or forward portions of the inclined faces 170 of extensions of folding members 149 and 150 lying parallel with and on opposite sides of the wheel 132, such inclined faces gradually rising in the direction of motion of said wheel 132. As a consequence, as wheel 132 continues to move, it causes these inclined faces to turn up the two end folds, as shown in Fig. 36, which operation is followed in rapid succession by the action of the projection 151, in folding down the first side fold and the projection 152 in folding down the second side fold, as shown in Figs. 37 and 38. A guard 171 extends rearwardly from the folder 149 and prevents the end folds from springing up until the wrapped gum, carried by the receiving-wheel, reaches its point of delivery.

*Assembling mechanism.*—Carried by a forwardly extending portion of the frame 1, is the assembling mechanism which is adapted to receive the separate packages of gum, as they are delivered from the receiving-wheel to form the same in bundles of five, each having one of the packages reversed in order that the label may face outwardly on both sides of the bundle, and deliver said bundles to the operator. Extending transversely across the receiving-wheel is a chute 172 and arms 173 extend upon each side of the wheel. To the outer side of the arms are secured spring-plates 174, carrying at their ends inwardly projecting catches 175. These catches are beveled, as at 176, and the incline is in the direction in which the package is delivered from the receiving-wheel, whereby the package, in passing between them, will force them outwardly. As the package is passed slightly beyond the catches, they will spring back into position and the front face thereof will serve to support the package in position and prevent it from falling or being forced backward into engagement with the receiving-wheel.

Secured to and extending upwardly and rearwardly from the arms 173 are a pair of guards 177, preferably formed of thin metal plates, which lie along both sides of the receiving-wheel and have their upper ends turned outwardly to aid in guiding the wrapped sticks of gum, as they are delivered from the receiving-wheel and to serve to press the wrapper closely against the ends of the gum, while such delivery is being made.

Immediately before each pocket in the receiving wheel reaches a point directly in front of the chute 172, the arm 144 of the pocket, will engage a projecting roller 178, mounted upon a block 179, secured to the inner side of one of the arms 173. As the arm engages this roller, it opens the pocket 140 and permits the package to be withdrawn therefrom. The means for removing the packages from the pockets 140, as they pass in front of the delivery chute, comprises a pair of fingers 180, which lie upon each side of the receiving-wheel and are secured at their lower ends to the outer end of a crank-arm 181, which at its inner end is secured upon a shaft 182. The shaft 182 has mounted on its opposite end a crank-arm 183, which is connected by the connecting-rod 184, with a cam-wheel 185, mounted upon the shaft 47. Carried upon the connecting-rod 184, is a roller 186, adapted to move in the irregular slot 187 of the cam-wheel and give the connecting-rod a reciprocating motion. The crank-arm 181 is thus given a reciprocating motion, and as the crank-arm swings upwardly, the fingers are moved upwardly and rearwardly into a position to permit the sides of the gum which project beyond the receiving-wheel to move in front of them (Fig. 27) and, as the crank-arm 181 swings downwardly, the fingers 180 are moved forwardly and downwardly and engage the projecting sides of the gum, removing the same from the pocket, and delivering the same between the catches 175 and into the chute 172.

It will be noted that the sides of the pockets 140 opposite the holding fingers 141 are undercut, forming an overhanging lip 143, and in order that the package may be readily removed from the pocket without this lip interfering with the removal thereof, or tearing the wrapper, it is necessary that the fingers 180 move downwardly more rapidly than the wheel revolves. By this movement, the fingers 180 in their downward movement tend to draw the package from beneath the lip of the pocket, whereby the same is effectually removed therefrom, without tearing the wrapper or breaking the gum. When the package has been delivered beyond the catches 175, the same is engaged on its opposite side by a plunger-head 188 comprising a square piece of metal, carried upon the plunger stem 189. This stem projects through the outer side of the chute 172, and is fitted within a tubular support 190 mounted upon the outer side of the chute 172. A slot 191 is formed in the tubular support, through which a pin 192 carried on the plunger stem 189 projects and engages with one end of a coiled spring 193, mounted upon the outer side of the tubular support 190. The opposite end of the spring engages an adjustable collar 194, which may be moved to adjust the tension of the spring. The tension of this spring serves to keep the plunger-head always in a forward position, and against the package, but permits the same to recede as each consecutive package is delivered to the chute. The plunger 188 not only serves to hold the package against displacement, as it is delivered into the chute, but also holds the end-folds of the wrapper in position, whereby they will not become unfolded and crumpled as the package is moved forward in the chute 172. After six packages have been delivered between the catches 175 and the plunger 188, a transversely moving plunger 195, which is carried upon one end of a rod 196, is adapted to move forward into the chute 172 and across the face of the receiving-wheel, and pushing five of the packages farther into the chute 172, to a position a little more than the width of one package in advance of their previous position directly in front of the receiving-wheel, the remaining package being retained in engagement with the catches 175. The rod 196 is connected with a lever 197 pivoted at an intermediate point upon a cross-piece 198, which constitutes a part of the frame 1. The opposite end of the lever 197 is provided with a roller 199, which operates in a slot 200 in the cam-wheel 201 mounted upon and driven by the shaft 19.

As previously stated, it is necessary that one of the outside packages should be reversed in order that the label of the wrapper should appear on both sides of the bundle when the same is delivered in a completed condition. To accomplish this result, the chute 172 is cut out, as at 202, to receive a supplemental chute or receiver which fits therein, and lies in a position to receive one package. This chute comprises a pair of upwardly extending side walls 203 and 204, which are mounted upon a base-block 205. The side walls are spaced apart just sufficient width to receive one package as the bundle of five is moved forward by the plunger 195. An upwardly extending side wall 206 is carried on the chute 172 and is tapered so thinly that it forms an entering wedge between the side wall 204 and the outer one of the four remaining packages, whereby said four remaining packages will be supported when the supplemental chute is removed. The base 205 of this chute is mounted upon the upper end of a shaft 207, mounted in a journal bearing 208 carried upon one end of an arm 209. The arm 209 extends from a hub 210, mounted upon a vertically arranged shaft or support 211, and the upper end of the hub 210 carries a crank-arm 212, connected at its outer end to a rod 213. The rod 213 at its opposite end is connected to a lever 214 pivoted at an intermediate point to the cross-piece 198, and having at its opposite end a roller 215, which operates in a slot 216 of the cam 201. Fig. 31 is a developed view of one-half the periphery of the cam 201, showing that, by its rotation, the lever 197 would be given two rapid reciprocations during each revolution and that the lever 214 would be given two more leisurely reciprocations during each revolution. Fig. 26 illustrates in dotted lines the motion thus given to the arm 209.

The lower end of the shaft 207 has loosely mounted upon it a pinion 217, adapted to mesh with a segment-gear 218 mounted upon the lower end of the support or shaft 211, and secured thereon by a set-screw 219. The shaft 207, immediately above the pinion, has an enlarged portion, provided at two of its opposite corners with teeth 220, and on its two opposite sides with flattened surfaces 221. These teeth are adapted to be engaged by a pawl 222, mounted upon the pinion and held in engagement therewith by a spring 223. A second spring 224, having one end thereof mounted upon a projection 225 of the arm 209 has its free end adapted to lie along the flattened portion 221 of the shaft. By this arrangement, as the arm 209 is moved outwardly the pinion, due to the engagement of the pawl 222, with one of the teeth 220, will cause the shaft to rotate and rotate the supplemental chute formed by the side walls 203 and 204, in which one package has been forced, as previously described. The segment 218 and the pinion 217 are so proportioned that when the arm 209 has reached the outermost limit of its movement, the supplemental chute has made one-half a revolution, whereby the package carried by the supplemental chute is reversed. As the arm moves inwardly and carries the supplemental chute toward the main chute 172, the spring 224, resting against the flattened sides 221 of the shaft 207, will prevent the same from rotating and the pawl 222 will pass backward from the tooth 220, whereby the pinion 217 will rotate without rotating the shaft. By this arrangement, it will be seen that the outer package of each bundle is reversed and the label side of the wrapper is turned outermost. At the completion of the reversal of this package, which has been performed during the delivery of another five packages to the main chute by the receiving-wheel, the plunger 195 will again move forward, moving the second bundle of packages forward into the chute 172 and this second bundle will force the first farther out into the main chute in a position to be removed therefrom by the operator, the outer package of the second bundle being forced into the supplemental chute will, of course, move the package contained therein out, and all five packages of the first bundle will be delivered together. When the bundles of packages are removed from the chute, they are in the form shown in Fig. 39.

In the operation, the gum is placed in the magazine and drops down through the opening in the base 3 into the pockets 23, of the feeding-wheel. The arms 6 and 7 serve, by their movement, to aline the pieces of gum one above the other and keep them away from the sides of the opening, through the base 3, so that it will not become clogged by the inaccurate alinement of the pieces or its surfaces become fouled because of the adhesive nature of the substance forming the articles to be wrapped. The paraffin paper 39 is fed through the guide 43, being carried along by the feeding-wheel 2, and lies along the surface thereof, beneath the guard 37 and on top of the gum as it lies in the pockets. As the feeding-wheel rotates, the knives 56 and 57 engage the paraffin paper as it is held in tension across the grooves 58 and sever it into pieces of the proper length in which to wrap the gum, the rubber-coated roller 45 feeding the wax paper and aiding in holding it while it is severed. As each consecutive piece of wax paper is severed from the remainder of the strip, it immediately passes from engagement with the roller 54 and as the front end thereof has previously passed between the roller 65 and the feeding-wheel 2, it is thus passed along. The labels are delivered, one sheet at a time, to the control of the receiving-wheel and the rollers 136 by the paper-feeding mechanism, as previously described, in such a way that the ends thereof are evenly spaced over the pockets 140. As the receiving-wheel revolves, there is no time when there is not at least one of the rubber rollers 136 in contact with the smooth circular portion of its periphery, so that there will be at all times one of said rubber rollers holding the label against the receiving-wheel until such time as its rearmost edge passes from under the last of said rubber rollers. A little in advance of a radial line through the centers of the receiving-wheel and the feeding-wheel 2, the plunger 25 starts to move outwardly, carrying with it the gum, together with its two wrappers. At this period in the operation, the paraffin paper and the label pass from beneath the roller 65 and the last of the rollers 136, respectively, and are thereafter held only by the pressure of the gum, holding them against the receiving-wheel. When the centers of the two pockets 23 and 140, respectively, have reached the radial line common to the two wheels, the plunger has reached its outermost position, as shown in Fig. 12, the arm 144 passes from the roller 146 and the finger 141 grasps the gum, with both wrappers, on one side and forces its other side under the lip 143 of the pocket 140. The gum and wrappers are then in the position shown in Fig. 32. In this position, the gum, with its wrappers, are carried by the receiving-wheel to the folding mechanism. The roller 161 on the spindle 160 moving forward more rapidly than the receiving-wheel, folds down the back fold of the wrapper, as in Fig. 33, the rod 165 holding the front fold out of interference therewith, as previously described. The front fold is turned down by passing beneath the stationary folder 156, as shown in Fig. 34. At this period in the operation, the roller 161 having completed its function on this particular package, recedes to repeat the operation on the next succeeding package. The gum, with its wrappers, now passes farther beneath the folder 156, is creased along the ends as in Fig. 35, the end folds are turned up, as in Fig. 36, these ends are turned down, one at a time, as in Figs. 37 and 38, and the completed package passes out from the stationary folder and under the guard 171, all as previously described in detail. While I have described this mechanism as making a wrap in which one end-fold overlaps the other, I do not wish to confine myself to a construction wherein one end-fold is folded down before the other. Where the ends of the wrapper are not sufficiently long to overlap each other, the principle of operation herein described can be made to work equally well by folding down the two end-folds simultaneously. The package then passes beyond the end of the guard 171 and is removed from the receiving-wheel by the fingers 180, which carry it forward into the chute 172, in which position it is held by the catches 175. As each consecutive package is delivered into this position, it pushes forward to meet the next preceding package, which, in turn, forces back the plunger 188.

After six packages of gum have been delivered into the chute, the plunger 195 moves forward, carrying with it the first five of the six packages. By this forward movement the first of the five packages is forced into the supplemental chute formed by the side walls 203 and 204. As the bundle of packages is thus pushed from engagement with the plunger 188, the same is forced by the spring 193 through a slot in the plunger 195, to its normal position, and engages with the remaining package. The plunger 195 now recedes to permit the next five packages to enter the chute from the receiving-wheel, and the supplemental chute is reversed, carrying with it the package contained therein, and returned to its normal position. Each time the plunger 195 moves forward, thus advancing a bundle of packages, one package which is not advanced is left in engagement with the catches 175, so that at the beginning of the operation of the machine, six packages must be delivered to the chute before one bundle is formed, but in consecutive operations, one bundle is formed for each additional five packages delivered. When the plunger 195 delivers the next five packages to the advanced position in the chute, the five packages in the first bundle are pushed to a still farther advanced position and the package which previously occupied the supplemental chute is forced therefrom and again comes in contact with the four remaining packages which constitute the first bundle and the same is complete and in condition to be removed from the machine.

Having thus described my invention what I claim as new and desire to secure by Letters Patent is:

1. In a wrapping machine, the combination with a rotating feeding wheel having pockets, of a substantially radially extending magazine therefor having the articles to be wrapped arranged therein, one above the other, and means for forcing the bottom article into the proper pocket.

2. In a wrapping machine, the combination with a rotating feeding wheel having pockets, of a substantially radially extending magazine therefor having the articles arranged therein one above the other, means for forcing the bottom article into the proper pocket, and means for dicharging the articles from the wheel at a predetermined point.

3. In a wrapping machine, the combination with a rotating feeding wheel having pockets adapted to receive one article each, of a stationary magazine therefor having the articles arranged therein one above the other whereby the gravity of the articles will tend to press the bottom article into said pockets as they pass the magazine, means operating in conjunction with the wheel to force the bottom article during its forward movement into a pocket and means for preventing the next higher article from moving forward with the bottom article.

4. In a wrapping machine, the combination with means for folding the wrapper about the article, of means for receiving the wrapped articles and assembling a predetermined number of the same into a bundle, catches for engaging the articles after the same have been delivered to said receiving means, and means engaging the first article and holding the articles against said catches as they are delivered, whereby the folds of the wrapper are held against the first article.

5. In a wrapping machine, the combination with a continuously rotating feeding wheel having peripheral pockets in which an article is carried, of a continuously rotating receiving wheel adapted to receive an article, said wheels being adapted to rotate tangentially, means for delivering a wrapper to the feeding wheel outside of the article contained in the pocket, and means for delivering the article and wrapper from one wheel to the other at the tangential point at a predetermined position on the wrapper.

6. In a wrapping machine, the combination with a continuously rotating wheel having one or more pockets arranged in its periphery adapted to receive the article and its wrapper, of means for folding the wrapper about the article as it is carried by said wheel, a continuously rotating feeding wheel having pockets in its periphery for receiving the article and adapted to run tangentially with said receiving wheel, means for delivering a wrapper over the article in the last named pocket, and means whereby the article with its wrapper are delivered from said feeding wheel to said receiving wheel at the tangential point.

7. In a wrapping machine, the combination with a continuously rotating receiving wheel having pockets formed therein for receiving an article and its wrapper, of means for folding said wrapper about the article as it is carried by said wheel, a continuously rotating feeding wheel having pockets in the periphery thereof for receiving the article and adapted to run tangentially with said receiving wheel, means for delivering the wrapper over the article to the pocket of the feed wheel, means for delivering the article with the wrapper from said feeding wheel to said receiving wheel at the tangential point, and means for delivering one or more other wrappers to said receiving wheel beneath the article and its superposed wrapper at the point of transfer.

8. In a wrapping machine, the combination with a continuously rotating receiving wheel having peripheral pockets for receiving articles and superposed wrappers, of means for folding the wrapper about an article as it is carried by said wheel, a continuously rotating feeding wheel having peripheral pockets and running tangentially to said receiving wheel, means for delivering the wrapper over the article to the pocket of the feed wheel, means for transferring the article with its wrapper from the feeding wheel to the receiving wheel at the tangential point, and a roller running tangentially to said receiving wheel for guiding and holding another wrapper between the article with its superposed wrapper, and the receiving wheel at the point of transfer.

9. In a wrapping machine, the combination with a continuously rotating receiving wheel having peripheral pockets, of means for holding a wrapper about the article as it is carried in a pocket in said wheel, a continuously rotating feeding wheel having peripheral pockets and running tangentially to said receiving wheel, means for transferring the article from the feeding wheel to the receiving wheel, a roller running tangentially with said feeding wheel for guiding one wrapper between the article and receiving wheel, and a second roller running tangentially with said receiving wheel for guiding a second wrapper between the first wrapper and the receiving wheel at a point where the article is transferred thereto.

10. In a wrapping machine, the combination with a continuously rotating receiving wheel having peripheral receptacles, of means for folding a wrapper about the article as it is carried by said wheel, a continuously rotating feeding wheel having peripheral receptacles and running tangentially with said receiving wheel, means for transferring the article from the feeding wheel to the receiving wheel, and rollers running tangentially to said receiving wheel for guiding and holding a wrapper between the article and the receiving wheel at the point of transfer.

11. In a wrapping machine, the combination with a continuously rotating receiving wheel having peripheral pockets adapted to receive the article and its wrapper, of means for folding the wrapper about the article as it is carried by said wheel, a continuously rotating feeding wheel having peripheral pockets to receive the article and running tangentially with said receiving wheel, movable bottoms operating in said pockets, means for operating said bottoms to deliver the article from said feeding wheel to said receiving wheel near the tangential point, and means on said movable bottoms to prevent the displacement of the article as the same is being delivered.

12. In a wrapping machine, the combination with a feeding wheel having pockets therein for the reception of articles to be wrapped and transverse grooves in the rim of the wheel between said pockets, of means for delivering a continuous strip of wrapping material along the periphery of the wheel across said pockets and the articles therein and said grooves, rollers running in tangential contact with the wheel to hold the strip in tension over said pockets and grooves, and a revolving cutter in register with one of said grooves in the rear of a pocket containing an article to be wrapped to sever the end of a strip to form a single wrapper.

13. In a wrapping machine, the combination with a receiving wheel adapted to receive an article and its wrapper, of a feeding wheel having pockets to carry the article and rotating tangentially with the receiving wheel, means for delivering the article from the feeding wheel to the receiving wheel at the tangential point and to a predetermined point on the wrapper, and a roller running tangentially to said receiving wheel for guiding and holding the wrapper on the receiving wheel.

14. In a wrapping machine, the combination with a continuously rotating wheel adapted to receive the article and the wrapper, of a continuously rotating feeding wheel having peripheral pockets in which the article is carried, and rotating tangentially with said receiving wheel, means for delivering the article from the feeding wheel to the receiving wheel at the tangential point and to a predetermined position upon the wrapper, a roller running tangentially with said feeding wheel for guiding and holding a wrapper and a second roller running tangentially with said receiving wheel for guiding and holding a second wrapper between the first wrapper and the receiving wheel 1 at the same point.

15. In a wrapping machine, the combination with a continuously rotating receiving wheel of a rotating feeding wheel having peripheral pockets in which the article is carried, both wheels rotating tangentially, means for delivering the wrapper over the article to the pocket of the feed wheel, means for delivering the article and a superposed wrapper from the feeding wheel to the receiving wheel at the tangential point and to a predetermined point upon a second wrapper, and means for delivering the second wrapper between the article and wrapper carried by the feeding wheel.

16. In a folder for wrapping machines, the combination with means for folding one fold of the wrapper, of stationary means for folding the opposite fold and creasing the paper along the ends of the article, stationary means for folding the end folds of the wrapper, and means for passing the article and wrapper through all of said stationary means.

17. In a wrapping machine, the combination with a movable member for folding the rear fold of the wrapper, of means for maintaining the front fold of the wrapper out of engagement with the rear fold until the same has been turned down, a stationary folder having means thereon for turning down the front fold, and creasing the two folded portions of the wrapper along the ends of the article, and stationary end folders through which the end folds of the wrapper are adapted to be passed and be folded upon the article and means for actuating the article and wrapper through all of said stationary means.

18. In a wrapping machine, the combination with means for carrying the article and its wrapper, of a movable member arranged adjacent to the path of said means, for folding one fold of the wrapper, a stationary folder arranged adjacent to said carrying means for turning down the opposite fold of the wrapper, having downwardly extending side portions adapted to crease the wrapper along each end of the article, a stationary folder having a portion thereof arranged along the side of the carrying means for turning up one end fold and a portion overhanging said carrying means for turning down said end fold and a second stationary folder having a portion arranged along the carrying means for turning up the opposite end fold, and an overhanging portion for turning the same down.

19. In a wrapping machine, the combination with means for wrapping the article, of means for assembling a predetermined number of wrapped articles, and means for reversing one or more of said articles after the same have been assembled.

20. In a wrapping machine, the combination with means for wrapping the article, of an assembling receptacle into which the wrapped articles are delivered, a movable compartment arranged in said receptacle, means after a predetermined number of articles have been delivered to said receptacle for moving the same therein and moving one of said articles into said movable compartment, and means for reversing said compartment.

21. In a wrapping machine, the combination with a continuously moving member carrying separate articles, of means for assembling a predetermined number of said articles, and means for reversing one or more of said articles after the same have been assembled.

22. In a wrapping machine, the combination with a continuously rotating wheel adapted to receive the article and its wrapper, of means for folding the wrapper about the article as it is carried by said wheel, a finger and means for actuating said finger for removing the article from the wheel after it has been wrapped, said finger having a combined outward and forward movement, said forward movement being more rapid than the rotary motion of the wheel.

23. In a wrapping machine, the combination with a continuously rotating wheel adapted to receive the article and its wrapper, of means for folding the wrapper about the article as it is carried by said wheel, a plurality of fingers and means for actuating them for removing the article from the wheel after it has been wrapped, said fingers having a combined outward and forward movement, said forward movement being more rapid than the rotary motion of the wheel.

24. In a wrapping machine, the combination with a continuously rotating member for receiving the article and the wrapper, of means for folding the wrapper about the article as the same is carried by said member, a continuously rotating feeding wheel to deliver the article thereto a magazine therefor to receive the articles one above the other, and means for forcing the bottom article to be delivered to said feeding wheel.

25. In a wrapping machine, the combination with a continuously rotating member for receiving the articles and the wrappers, of means for folding the wrapper about the article as the same is carried by said member, a continuously rotating feeding wheel having pockets therein for delivering the articles to said member, a magazine therefor to receive the articles one above the other, and means for forcing the bottom article into the pockets in the delivery wheel.

26. In a wrapping machine, the combination with a continuously rotating member for receiving the article and the wrapper, of means for folding the wrapper about the article as the same is carried by said member, a continuously rotating feeding wheel for delivering the article to the receiving member, having pockets arranged therein to receive the article, means for forcing an article into each pocket, movable bottoms operating in said pockets for forcing the article therefrom, and means for operating said movable bottoms when the pockets arrive opposite a predetermined point on said receiving member to deliver the article thereto.

27. In a wrapping machine, the combination with a continuously rotating member for receiving the article and the wrapper, of means for folding the wrapper about the article as the same is carried by said member, a continuously rotating feeding wheel for delivering the article to the receiving member, having pockets arranged therein, means for forcing an article into each pocket, movable bottoms operating in said pockets, means for operating said movable bottoms to permit the article to drop into said pockets as they pass a predetermined point, and means for operating said movable bottoms to force the article out of the pockets when the same arrive opposite a predetermined point on said receiving member to deliver the article thereto.

28. In a wrapping machine, the combination with a continuously rotating member, having normally obstructed pockets to receive the wrapper and the article, means for folding the wrapper about the article as it is carried by said member, a continuously rotating feeding wheel for delivering the article to the receiving member, having pockets arranged therein, means for forcing an article into each of the last named pockets, means for removing the obstruction from a pocket in the receiving member when the same arrives opposite a pocket in the feeding member, and means for delivering the article from said feeding member to said open pocket.

29. In a wrapping machine, the combination with a continuously rotating member for receiving the article and the wrapper, of means for folding the wrapper about the article while carried by said member, of means for receiving the wrapped articles from said member and assembling a predetermined number of the same into a package, and means for reversing one of said articles after the same have been assembled.

30. In a wrapping machine, the combination with a continuously rotating member for receiving the article and the wrapper, of means for folding the wrapper about the article as it is carried by said member, a continuously rotating feeding member for delivering the article to the receiving member, means for receiving the wrapped articles and assembling a predetermined number thereof into a package, and means for reversing one of said articles after the same have been assembled.

31. In a wrapping machine, the combination with a continuously rotating member for receiving the article and the wrapper, of a continuously rotating feeding member for delivering the article to the receiving member, means for folding the rear fold of the wrapper, stationary means for folding the front fold of the wrapper, stationary means for folding the end folds of the wrapper, said stationary means operating as the article is passed therethrough by said receiving member, means for receiving the wrapped articles and assembling a predetermined number thereof into a package, and means for reversing one of the articles after the same have been assembled.

32. In a wrapping machine, the combination with a continuously rotating member for receiving the article and the wrapper, of a continuously rotating feeding member for delivering the article thereto, movable means for folding one fold of the wrapper, stationary means for folding the opposite fold, and creasing the wrapper along the ends of the article, stationary means for folding the end folds of the wrapper, said stationary means operating as the article is passed therethrough by the receiving member, means for receiving the wrapped articles and assembling a predetermined number thereof into a package, and means for reversing one of said articles after the same have been assembled.

33. In a wrapping machine, the combination with a continuously moving member for receiving the article and the wrapper, of a continuously moving feeding member for delivering the article thereto, a movable member for folding one fold of the wrapper, stationary means for folding the opposite fold, and creasing the wrapper along the ends of the article, stationary means for folding the end folds of the wrapper, said stationary means operating as the article is passed therethrough by said continuously moving receiving member, means for receiving the wrapped articles and assembling a predetermined number thereof into a package, and means for reversing one of said articles after the same have been assembled.

34. In a wrapping machine, the combination with means for folding the wrapper about the article, of means for receiving the wrapped articles and assembling a predetermined number of the same into a package, catches or dogs for engaging the article after the same has been delivered to the said receiving means, and means for holding said articles against said catches until a predetermined number of articles have been received.

In witness whereof, I have hereunto subscribed my name in the presence of two witnesses.

ALBERT M. PRICE.

Witnesses:
W. PERRY HAHN,
ELIZABETH K. KING.